United States Patent
Konishi et al.

(10) Patent No.: US 11,951,731 B2
(45) Date of Patent: Apr. 9, 2024

(54) MULTILAYER BODY AND METHOD FOR PRODUCING SAME

(71) Applicant: KURARAY CO., LTD., Okayama (JP)

(72) Inventors: Daisuke Konishi, Ibaraki (JP); Hiromitsu Sasaki, Ibaraki (JP); Yuta Tomishima, Ibaraki (JP)

(73) Assignee: KURARAY CO., LTD., Okayama (JP)

( * ) Notice: Subject to any disclaimer, the term of this patent is extended or adjusted under 35 U.S.C. 154(b) by 0 days.

(21) Appl. No.: 17/802,637

(22) PCT Filed: Feb. 25, 2021

(86) PCT No.: PCT/JP2021/007194
§ 371 (c)(1),
(2) Date: Aug. 26, 2022

(87) PCT Pub. No.: WO2021/172470
PCT Pub. Date: Sep. 2, 2021

(65) Prior Publication Data
US 2023/0109535 A1      Apr. 6, 2023

(30) Foreign Application Priority Data
Feb. 27, 2020   (JP) .................. 2020-032158

(51) Int. Cl.
*B32B 7/12* (2006.01)
*B32B 15/082* (2006.01)
(Continued)

(52) U.S. Cl.
CPC ............. *B32B 7/12* (2013.01); *B32B 15/082* (2013.01); *B32B 15/18* (2013.01); *B32B 27/08* (2013.01);
(Continued)

(58) Field of Classification Search
None
See application file for complete search history.

(56) References Cited

U.S. PATENT DOCUMENTS

| 2009/0137716 A1 | 5/2009 | Furukawa et al. |
| 2009/0269590 A1 | 10/2009 | Furukawa et al. |

(Continued)

FOREIGN PATENT DOCUMENTS

| CA | 3 101 953 A1 | 12/2019 |
| CN | 105934479 A | 9/2016 |

(Continued)

OTHER PUBLICATIONS

The Mechanics of Adhesion, Dillard et al., Chapter 7—Surface roughness and adhesion (Year: 2002).*

(Continued)

*Primary Examiner* — Ramsey Zacharia
(74) *Attorney, Agent, or Firm* — GREENBLUM & BERNSTEIN, P.L.C.

(57) ABSTRACT

Provided are a multilayer body in which base materials composed of a metal, a resin or the like are firmly bonded to each other even when not subjected to primer treatment or the like, and a method for producing the multilayer body. The multilayer body has a base material (X), an adhesive layer (Y), and a base material (Z) in this order, wherein the adhesive layer (Y) contains a hydrogenated block copolymer (A) obtained by hydrogenating a block copolymer (P) containing a polymer block (a) composed of a structural unit derived from an aromatic vinyl compound and a polymer block (b) composed of a structural unit derived from a conjugated diene, the mass ratio [(a)/(b)] of the polymer block (a) to the polymer block (b) is 1/99 to 50/50, and the adhesive layer (Y) has a storage modulus G' at 100° C. of $1.2 \times 10^5$ to $4.0 \times 10^5$ Pa.

18 Claims, 1 Drawing Sheet

(51) Int. Cl.
  *B32B 15/18*   (2006.01)
  *B32B 27/08*   (2006.01)
  *B32B 27/30*   (2006.01)
  *B32B 37/10*   (2006.01)
  *B32B 37/12*   (2006.01)

(52) U.S. Cl.
  CPC ............ *B32B 27/302* (2013.01); *B32B 37/10* (2013.01); *B32B 37/12* (2013.01); *B32B 2274/00* (2013.01); *B32B 2307/536* (2013.01); *B32B 2307/538* (2013.01); *B32B 2307/542* (2013.01)

(56) References Cited

U.S. PATENT DOCUMENTS

| | | | | |
|---|---|---|---|---|
| 2013/0008506 | A1* | 1/2013 | Tanahashi | C09J 153/025 136/259 |
| 2016/0312023 | A1 | 10/2016 | Tanaka et al. | |
| 2017/0158916 | A1* | 6/2017 | Akiyama | C09J 5/00 |
| 2018/0030194 | A1 | 2/2018 | Uehara et al. | |

FOREIGN PATENT DOCUMENTS

| | | |
|---|---|---|
| JP | S63-25005 A | 2/1988 |
| JP | H9-156035 A | 6/1997 |
| JP | H10-29276 A | 2/1998 |
| JP | 2006-206715 A | 8/2006 |
| JP | 2006-291019 A | 10/2006 |
| JP | 2009-227844 A | 10/2009 |
| JP | 2010-1364 A | 1/2010 |
| JP | 2017-8308 A | 1/2017 |
| JP | 2018-024776 A | 2/2018 |
| WO | WO 2018/143373 A1 | 8/2018 |
| WO | WO 2019/103048 A1 | 5/2019 |
| WO | WO 2020/235663 A1 | 11/2020 |

OTHER PUBLICATIONS

ISR for PCT/JP2021/007194, dated May 11, 2021.
Official communication issued in EP Patent Application No. 21759582.6, dated Feb. 16, 2024.

* cited by examiner

[Fig. 1]
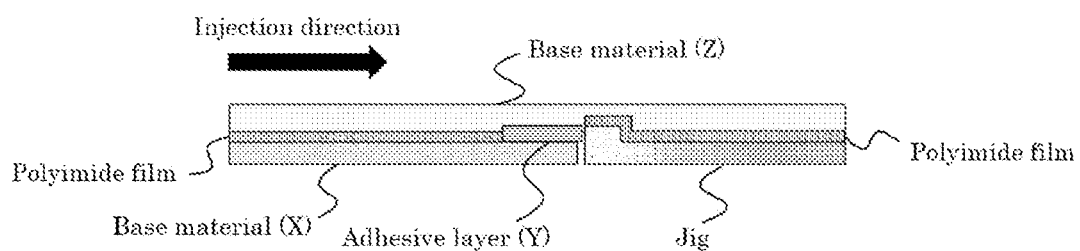
[Fig. 2]
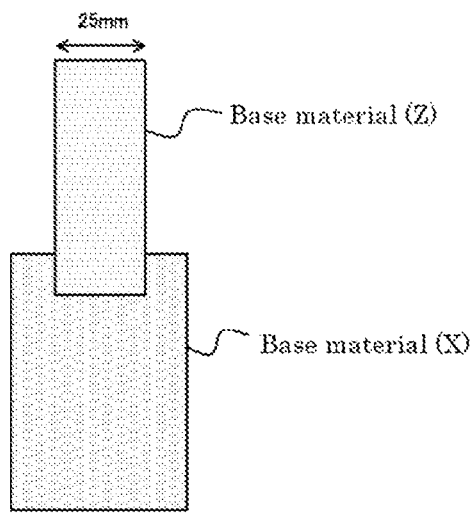

MULTILAYER BODY AND METHOD FOR PRODUCING SAME

TECHNICAL FIELD

The present invention relates to a multilayer body having an adhesive layer containing a hydrogenated block copolymer obtained by hydrogenating a block copolymer containing a polymer block composed of a structural unit derived from an aromatic vinyl compound and a polymer block composed of a structural unit derived from a conjugated diene, and a method for producing the multilayer body.

BACKGROUND ART

Ceramics, metals, and synthetic resins are excellent in durability, heat resistance, and mechanical strength, and thus are used in various applications such as home electric appliances, electronic components, mechanical components, and automobile components. These members are sometimes used as a multilayer body laminated with an elastomer excellent in flexibility for the purpose of fixation to other structural members, impact absorption, breakage prevention, sealing, and the like, depending on the application, component configuration, use method, and the like.

As such an elastomer, a styrene-based thermoplastic elastomer excellent in flexibility, mechanical properties, and molding processability is suitably used. Here, the styrene-based thermoplastic elastomer refers to a block copolymer having a polymer block composed of a structural unit derived from an aromatic vinyl compound and a polymer block composed of a structural unit derived from a conjugated diene, or a hydrogenated product thereof.

However, conventional styrene-based thermoplastic elastomers have a problem in that they show insufficient adhesion to ceramics, metals and the like and are difficult to be melt-bonded as they are. Therefore, in order to bond a ceramic or a metal to a styrene-based thermoplastic elastomer, a method of separately applying an adhesive or applying a primer treatment on a surface of a ceramic, a metal, or a synthetic resin has been disclosed (see PTLs 1 to 6).

CITATION LIST

Patent Literature

PTL 1: JP 2006-291019 A
PTL 2: JP 2006-206715 A
PTL 3: JP 63-25005 A
PTL 4: JP 9-156035 A
PTL 5: JP 2009-227844 A
PTL 6: JP 2010-1364 A

SUMMARY OF INVENTION

Technical Problem

As described above, the methods described in PTLs 1 to 6 are complicated because separate application of an adhesive, primer treatment, and the like are necessary, and improvement has been required because the adhesive force is insufficient.

The present invention has been made in view of the above circumstances, and an object thereof is to provide a multilayer body in which base materials made of a metal, a resin, and the like are firmly bonded to each other even in a case where a primer treatment or the like is not applied, and a method for producing the multilayer body.

Solution to Problem

As a result of intensive studies, the present inventors have found that the above-described problems can be solved by adjusting the storage modulus at 100° C. measured by dynamic viscoelasticity measurement to a specific range with respect to an adhesive layer containing a hydrogenated block copolymer, and have completed the present invention.

That is, the gist of the present invention is the following [1] to [19].

[1] A multilayer body having a base material (X), an adhesive layer (Y), and a base material (Z) in this order, wherein the adhesive layer (Y) contains a hydrogenated block copolymer (A) obtained by hydrogenating a block copolymer (P) containing a polymer block (a) composed of a structural unit derived from an aromatic vinyl compound and a polymer block (b) composed of a structural unit derived from a conjugated diene, the mass ratio [(a)/(b)] of the polymer block (a) to the polymer block (b) is 1/99 to 50/50, and the adhesive layer (Y) has a storage modulus G' at 100° C. of $1.20 \times 10^5$ to $4.00 \times 10^5$ Pa.

[2] The multilayer body as set forth in [1], wherein the adhesive layer (Y) has a loss modulus G" at 100° C. of $3.00 \times 10^4$ to $2.50 \times 10^5$ Pa.

[3] The multilayer body as set forth in [1] or [2], wherein the adhesive layer (Y) is composed of a thermoplastic elastomer composition containing a hydrogenated block copolymer (A).

[4] The multilayer body as set forth in any one of [1] to [3], wherein the polymer block (b) contains 1 to 100% by mass of a structural unit (b1) derived from farnesene and contains 0 to 99% by mass of a structural unit (b2) derived from a conjugated diene other than farnesene.

[5] The multilayer body as set forth in [4], wherein the conjugated diene other than farnesene is at least one selected from butadiene, isoprene, and myrcene.

[6] The multilayer body as set forth in any one of [1] to [5], wherein a hydrogenation rate of the carbon-carbon double bond in the polymer block (b) is 70 mol % or more.

[7] The multilayer body as set forth in any one of [1] to [6], wherein the hydrogenated block copolymer (A) has a peak top molecular weight (Mp) of 4,000 to 1,500,000.

[8] The multilayer body as set forth in any one of [1] to [7], wherein the hydrogenated block copolymer (A) has a molecular weight distribution (Mw/Mn) of 1.00 to 4.00.

[9] The multilayer body as set forth in any one of [1] to [8], wherein the aromatic vinyl compound is styrene.

[10] The multilayer body as set forth in [9], wherein the polymer block (a) composed of a structural unit derived from styrene has a peak top molecular weight of 2,000 to 55,000.

[11] The multilayer body as set forth in any one of [1] to [10], wherein the base material (X) and the base material (Z) are each independently at least one selected from a metal, a polar resin, a polyolefin resin, a carbon fiber, glass, and ceramics.

[12] The multilayer body as set forth in any one of [1] to [11], wherein the adhesive layer (Y) satisfies the following relational expression (i):

$$[(\text{hardness at } 0° \text{ C./hardness at } 23° \text{ C.}) \times 100 \leq 140] \qquad (i).$$

[13] The multilayer body as set forth in any one of [1] to [12], wherein the hydrogenated block copolymer (A) is a mixture of two or more kinds of hydrogenated block copolymers, and a content of a diblock copolymer in the hydrogenated block copolymer (A) is 50% by mass or less.

[14] The multilayer body as set forth in any one of [1] to [13], wherein a shear adhesive force of the adhesive layer (Y) at 23° C. is 10 N/cm$^2$ or more when a stainless steel plate is used as the base material (X) and a polyacetal resin is used as the base material (Z).

[15] The multilayer body as set forth in any one of [1] to [14], wherein the base material (X) and the base material (Z) each have an arithmetic average roughness (Ra) of 0.010 to 10 μm.

[16] A method for producing the multilayer body as set forth in any one of [1] to [15], including: a step (I-a) of press-molding the adhesive layer (Y) onto the base material (X); and a step (II) of injection-molding the base material (Z) onto the adhesive layer (Y) after the step (I-a).

[17] A method for producing the multilayer body as set forth in any one of [1] to [15], including: a step (I-b) of forming the adhesive layer (Y) by applying a solution and/or an aqueous emulsion containing the hydrogenated block copolymer (A) onto the base material (X) and then drying the solution and/or the aqueous emulsion; and a step (II) of injection-molding the base material (Z) onto the adhesive layer (Y) after the step (I-b).

[18] A method for producing the multilayer body as set forth in any one of [1] to [15], including: a step (I-c) of press-molding the adhesive layer (Y) onto the base material (X); and a step (II-c) of press-molding the base material (Z) onto the adhesive layer (Y) after the step (I-c).

[19] The method for producing a multilayer body as set forth in any one of [16] to [18], wherein the base material (X) is a metal, and the base material (Z) is a polar resin or a polyolefin resin.

Advantageous Effects of Invention

According to the present invention, it is possible to provide a multilayer body in which base materials composed of a metal, a resin or the like are firmly bonded to each other even when not applied to primer treatment or the like, and a method for producing the multilayer body.

BRIEF DESCRIPTION OF DRAWINGS

FIG. 1 is a cross-sectional view of a multilayer body (test piece) used for measurement of adhesive force in Examples.

FIG. 2 is a view of a test piece used for measurement of adhesive force in Examples, as viewed from the base material (Z) side.

DESCRIPTION OF EMBODIMENTS

[1] Multilayer Body

The multilayer body of the present invention is a multilayer body having a base material (X), an adhesive layer (Y), and a base material (Z) in this order, wherein the adhesive layer (Y) contains a hydrogenated block copolymer (A) obtained by hydrogenating a block copolymer (P) containing a polymer block (a) composed of a structural unit derived from an aromatic vinyl compound and a polymer block (b) composed of a structural unit derived from a conjugated diene, the mass ratio [(a)/(b)] of the polymer block (a) to the polymer block (b) is 1/99 to 50/50, and the adhesive layer (Y) has a storage modulus G' at 100° C. of $1.20 \times 10^5$ to $4.00 \times 10^5$ Pa.

Hereinafter, the configuration of the present invention will be described in detail.

[Adhesive Layer (Y)]

The adhesive layer (Y) in the present invention contains the hydrogenated block copolymer (A) described later, and has a storage modulus G' at 100° C. of $1.20 \times 10^5$ to $4.00 \times 10^5$ Pa as measured by dynamic viscoelasticity measurement.

In the present invention, since an adhesive layer having a storage modulus G' at 100° C. of $1.20 \times 10^5$ to $4.00 \times 10^5$ Pa is used as the adhesive layer, excellent adhesiveness is exhibited even to base materials having low polarity, such as propylene resins, which have been difficult to adhere by conventional methods. The reason why excellent effects are exhibited when the storage modulus at 100° C. is within the above range is not clear, but it is considered that when the storage modulus at 100° C., which is a temperature close to the temperature at the time of producing a multilayer body by injection-molding, press-molding, or the like, is within the range, the hydrogenated block copolymer and the base material are easily compatible and adhere to each other, and thus the adhesiveness between the adhesive layer (Y) and the base material is improved.

From the viewpoint of further improving the adhesiveness of the adhesive layer (Y), the storage modulus G' at 100° C. is preferably $3.50 \times 10^5$ Pa or less, more preferably $3.00 \times 10^5$ Pa or less, and still more preferably $2.80 \times 10^5$ Pa or less, and the storage modulus G' is preferably $1.30 \times 10^5$ Pa or more, more preferably $1.50 \times 10^5$ Pa or more, and still more preferably $1.70 \times 10^5$ Pa or more.

In the present invention, the storage modulus G' at 100° C. refers to a value measured by the method described in Examples.

The adhesive layer (Y) preferably has a storage modulus G' at 0° C. measured by dynamic viscoelasticity measurement of $4.00 \times 10^5$ to $5.00 \times 10^8$ Pa. When the storage modulus G' at 0° C. is equal to or less than the upper limit value, the multilayer body of the present invention exhibits strong adhesiveness even when exposed to an atmosphere at 0° C. From this viewpoint, the storage modulus G' at 0° C. is preferably $5.00 \times 10^7$ Pa or less, more preferably $5.00 \times 10^6$ Pa or less, and still more preferably $8.00 \times 10^5$ Pa or less. From the viewpoint of adhesiveness in an atmosphere at 0° C., the storage modulus G' of the adhesive layer (Y) at 0° C. is preferably $4.00 \times 10^5$ Pa or more.

In the present invention, the storage modulus G' at 0° C. refers to a value measured by the method described in Examples.

From the viewpoint of further improving the adhesiveness of the adhesive layer (Y), for the hydrogenated block copolymer (A) described later, the loss modulus G" at 100° C. as measured by dynamic viscoelasticity measurement is preferably $3.00 \times 10^4$ Pa to $2.50 \times 10^5$ Pa. The loss modulus G" at 100° C. is preferably $3.50 \times 10^4$ Pa or more, more preferably $4.00 \times 10^4$ Pa or more, and still more preferably $4.50 \times 10^4$ Pa or more. Further, the loss modulus G" at 100° C. is preferably $2.00 \times 10^5$ Pa or less, more preferably $1.50 \times 10^5$ Pa or less, and still more preferably $1.00 \times 10^5$ Pa or less.

In the present invention, the loss modulus G" at 100° C. refers to a value measured by the method described in Examples.

The shear adhesive force of the adhesive layer (Y) at 23° C. is preferably 10 N/cm$^2$ or more, more preferably 15 N/cm$^2$ or more, and still more preferably 20 N/cm$^2$.

The shear adhesive force at 23° C. of the adhesive layer (Y) refers to the shear adhesive force of the adhesive layer (Y) when a stainless steel plate is used as the base material (X) and a polyacetal resin is used as the base material (Z), and can be specifically measured by the measurement method described in Examples.

From the viewpoint of using the adhesive layer (Y) in a wide temperature range, it is preferable that an increase in hardness under a low-temperature atmosphere is smaller than an increase in hardness under a high-temperature atmosphere. When the increase in hardness under the low-temperature atmosphere is large, the rubber elasticity is lowered, and the adhesive layer (Y) tends to peel off when it receives an impact. From the above viewpoint, as one of preferred embodiments of the resin composition of the present embodiment, s in the following relational expression (i) is preferably 140 or less, more preferably 130 or less, still more preferably 120 or less, and particularly preferably 115 or less.

$$[(\text{hardness at }0°\text{ C.}/\text{hardness at }23°\text{ C.})\times 100 \le s] \quad (i)$$

In the above relational expression (i), the "hardness at 23° C." represents a hardness measured at an atmospheric temperature of 23° C. by a type A durometer method of JIS K 6253-2:2012.

The "hardness at 0° C." refers to a hardness measured at an atmospheric temperature of 0° C. by a type A durometer method according to JIS K 6253-2:2012.

The thickness of the adhesive layer (Y) is not particularly specified, but is preferably 0.001 to 10.00 mm, more preferably 0.005 to 5.00 mm, still more preferably 0.01 to 2.50 mm, particularly preferably 0.01 to 1.50 mm, and most preferably 0.01 to 1.00 mm from the viewpoint of reducing the weight of the multilayer body and improving the degree of freedom of design.

<Hydrogenated Block Copolymer (A)>

The adhesive layer (Y) contains a hydrogenated block copolymer (A). When the adhesive layer (Y) contains the hydrogenated block copolymer (A), the base material (X) and the base material (Z) can be firmly bonded to each other due to the flexibility of the hydrogenated block copolymer (A).

The hydrogenated block copolymer (A) contains a polymer block (a) composed of a structural unit derived from an aromatic vinyl compound and a polymer block (b) composed of a structural unit derived from a conjugated diene.

Examples of the aromatic vinyl compound constituting the polymer block (a) include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene, and divinylbenzene. These aromatic vinyl compounds may be used alone or in combination of two or more thereof.

Among these, styrene, α-methylstyrene, and 4-methylstyrene are more preferable, and styrene is still more preferable.

When the polymer block (a) is composed of a structural unit derived from styrene, the peak top molecular weight (Mp) thereof is preferably 2,000 to 55,000, more preferably 4,000 to 20,000, and still more preferably 5,000 to 10,000, from the viewpoint of improving the adhesiveness and molding processability of the adhesive layer (Y). The peak top molecular weight (Mp) in the description herein means a value measured by a method described in Examples described later.

The "peak top molecular weight" described in the description herein and claims is a peak top molecular weight in terms of standard polystyrene obtained by gel permeation chromatography (GPC) measurement, and more specifically, a value measured according to the method described in Examples.

The peak top molecular weight of each polymer block contained in the block copolymer (P) can be determined by measuring a sampled liquid every time polymerization of each polymer block is completed in the production process. For example, when a triblock copolymer having an a1-b-a2 structure is synthesized by sequential polymerization in the order of a1, b, and a2, the peak top molecular weight of the first polymer block a1 can be determined by GPC measurement of a liquid sampled at the time of completion of the polymerization of a1. Further, the peak top molecular weight of the polymer block b can be determined by measuring the peak top molecular weight of the diblock copolymer having the structure of a1-b by GPC measurement of a liquid sampled at the time of completion of the polymerization of b, and subtracting the peak top molecular weight of the polymer block a1 from the value. Furthermore, the peak top molecular weight of the polymer block a2 can be determined by measuring the peak top molecular weight of the triblock copolymer having the a1-b-a2 structure by GPC measurement of a liquid sampled at the time of completion of the polymerization of a2, and subtracting the peak top molecular weight of the diblock copolymer having the structure of a1-b from the value.

Examples of the conjugated diene constituting the polymer block (b) include butadiene, isoprene, 2,3-dimethylbutadiene, 2-phenyl-butadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene, farnesene, and chloroprene. These may be used alone or in combination of two or more thereof.

Among these, butadiene, isoprene, myrcene, and farnesene are more preferable, and farnesene is still more preferable.

The farnesene used as the conjugated diene may be either α-farnesene or β-farnesene represented by the following formula (I), but from the viewpoint of easy production of the hydrogenated block copolymer, β-farnesene is preferably used. Note that α-farnesene and β-farnesene may be used in combination.

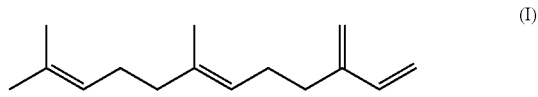

(I)

In the polymer block (b) of the present invention, from the viewpoint of improving the adhesiveness of the adhesive layer (Y), the structural unit (b1) derived from farnesene and the structural unit (b2) derived from a conjugated diene other than farnesene may be used in combination.

The content of the structural unit (b1) derived from farnesene in the polymer block (b) is preferably 1 to 100% by mass, more preferably 30 to 95% by mass, still more preferably 45 to 90% by mass, and yet still more preferably 50 to 80% by mass.

On the other hand, the content of the structural unit (b2) derived from a conjugated diene other than farnesene in the polymer block (b) is preferably 0 to 99% by mass, more preferably 5 to 70% by mass, still more preferably 10 to 55% by mass, and yet still more preferably 20 to 50% by mass.

The conjugated diene other than farnesene is preferably at least one selected from butadiene, isoprene, and myrcene.

The mass ratio [(a)/(b)] of the polymer block (a) to the polymer block (b) is 1/99 to 50/50. When the content of the polymer block (a) is less than the lower limit value, it is impossible to obtain a hydrogenated block copolymer which is excellent in flexibility and molding processability and has a strong adhesive force. On the other hand, when the content of the polymer block (a) exceeds the upper limit value, the molding processability and the adhesive force are lowered. From this viewpoint, the mass ratio [(a)/(b)] of the polymer block (a) to the polymer block (b) is preferably 5/95 to 40/60, more preferably 8/92 to 30/70, and still more preferably 10/90 to 25/75.

The hydrogenated block copolymer (A) is a hydrogenated product of a block copolymer (P) containing at least one polymer block (a) and at least one polymer block (b), and is preferably a hydrogenated product of a block copolymer (P) containing two or more polymer blocks (a) and one or more polymer blocks (b).

The bonding form of the polymer block (a) and the polymer block (b) is not particularly limited, and may be linear, branched, radial, or a combination of two or more thereof. Among them, a form in which the respective blocks are linearly bonded is preferable, and when the polymer block (a) is represented by a and the polymer block (b) is represented by b, a bonding form represented by $(a-b)_l$, $a-(b-a)_m$, or $b-(a-b)_n$ is preferable. Each of l, m, and n independently represents an integer of 1 or more.

As the bonding form, copolymers represented by b-a-b-a-b or a-b-a are preferable from the viewpoints of flexibility, molding processability, handling properties, and the like.

The hydrogenated block copolymer (A) may be composed of one type of hydrogenated block copolymer, or may be a mixture of two or more types of hydrogenated block copolymers, for example, a mixture of the triblock or higher block copolymer and a so-called diblock copolymer represented by (a-b). However, from the viewpoint of improving the adhesive durability (heat resistance and the like) of the adhesive layer (Y), the content of the diblock copolymer in the hydrogenated block copolymer (A) is desirably 50% by mass or less, more preferably 40% by mass or less, particularly preferably 30% by mass or less, and most preferably 20% by mass or less.

In addition, in the present invention, it is also possible to use a polymer having a bonding form represented by b1-a-b2-a-b1, which is obtained by producing a polymer arm having a bonding form represented by b1-a-b2-Li by anionic polymerization (wherein "Li" represents an active terminal when anionic polymerization is performed using BuLi) and then coupling the polymer arm using a coupling agent. At this time, the content of the block copolymer in the bonded form represented by b1-a-b2 derived from the polymer arm which remains uncoupled is preferably 50% by mass or less, more preferably 40% by mass or less, still more preferably 30% by mass or less, and yet still more preferably 20% by mass or less in the hydrogenated block copolymer (A) from the viewpoint of preventing deterioration in adhesive durability (heat resistance and the like).

Further, when the block copolymer (P) has two or more polymer blocks (a) or two or more polymer blocks (b), each polymer block may be a polymer block composed of the same structural unit or a polymer block composed of different structural units. For example, in the two polymer blocks (a) in the triblock copolymer represented by [a-b-a], the kinds of the respective aromatic vinyl compounds may be the same or different.

The peak top molecular weight (Mp) of the hydrogenated block copolymer (A) is preferably 4,000 to 1,500,000, more preferably 10,000 to 1,200,000, still more preferably 50,000 to 800,000, and yet still more preferably 80,000 to 500,000, from the viewpoint of improving the adhesiveness and molding processability of the adhesive layer (Y). The peak top molecular weight (Mp) in the description herein means a value measured by a method described in Examples described later.

The molecular weight distribution (Mw/Mn) of the hydrogenated block copolymer (A) is preferably 1.00 to 4.00, more preferably 1.00 to 3.00, and still more preferably 1.00 to 2.00. When the molecular weight distribution is within the above range, the variation in viscosity of the hydrogenated block copolymer (A) is small, and handling is easy.

The block copolymer (P) may contain, in addition to the polymer block (a) and the polymer block (b), a polymer block (c) composed of other monomers as long as the effects of the present invention are not impaired.

Examples of such other monomers include unsaturated hydrocarbon compounds such as propylene, 1-butene, 1-pentene, 4-methyl-1-pentene, 1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene; and functional group-containing unsaturated compounds such as acrylic acid, methacrylic acid, methyl acrylate, methyl methacrylate, acrylonitrile, methacrylonitrile, maleic acid, fumaric acid, crotonic acid, itaconic acid, 2-acryloylethanesulfonic acid, 2-methacryloylethanesulfonic acid, 2-acrylamido-2-methylpropanesulfonic acid, 2-methacrylamido-2-methylpropanesulfonic acid, vinylsulfonic acid, vinyl acetate, and methyl vinyl ether. These may be used alone or in combination of two or more thereof.

When the block copolymer (P) has the polymer block (c), the content thereof is preferably 50% by mass or less, more preferably 40% by mass or less, and still more preferably 30% by mass or less.

<Method for Producing Hydrogenated Block Copolymer (A)>

The hydrogenated block copolymer (A) can be suitably produced by, for example, a polymerization step of obtaining the block copolymer (P) by anionic polymerization, and a step of hydrogenating the carbon-carbon double bond in the polymer block (b) in the block copolymer (P).

[Polymerization Step]

The block copolymer (P) can be produced by a solution polymerization method, a method described in JP 2012-502135 T and JP 2012-502136 T, or the like. Among them, a solution polymerization method is preferable, and for example, a known method such as an ionic polymerization method such as anionic polymerization or cationic polymerization, or a radical polymerization method can be applied. Among them, anionic polymerization is preferable. In the anionic polymerization method, an aromatic vinyl compound, farnesene and/or a conjugated diene other than farnesene are sequentially added in the presence of a solvent, an anionic polymerization initiator, and optionally a Lewis base to obtain a block copolymer (P).

Examples of the anionic polymerization initiator include alkali metals such as lithium, sodium, and potassium; alkaline earth metals such as beryllium, magnesium, calcium, strontium, and barium; lanthanoid-based rare earth metals such as lanthanum and neodymium; and compounds containing the alkali metals, the alkaline earth metals, and the lanthanoid-based rare earth metals. Among them, alkali metals and compounds containing alkali metals are preferable, and organic alkali metal compounds are more preferable.

Examples of the organic alkali metal compound include organolithium compounds such as methyllithium, ethyllithium, n-butyllithium, sec-butyllithium, t-butyllithium, hexyllithium, phenyllithium, stilbenelithium, dilithiomethane, dilithionaphthalene, 1,4-dilithiobutane, 1,4-dilithio-2-ethylcyclohexane, and 1,3,5-trilithiobenzene; and sodium naphthalene and potassium naphthalene. Among them, organolithium compounds are preferable, n-butyllithium and sec-butyllithium are more preferable, and sec-butyllithium is particularly preferable. The organic alkali metal compound may be reacted with a secondary amine such as diisopropylamine, dibutylamine, dihexylamine or dibenzylamine, and may be used as an organic alkali metal amide.

The amount of the organic alkali metal compound used for polymerization varies depending on the molecular weight of the block copolymer (P), but is usually in the range of 0.01 to 3% by mass with respect to the total amount of the aromatic vinyl compound, farnesene, and conjugated diene other than farnesene.

The solvent is not particularly limited as long as it does not adversely affect the anionic polymerization reaction, and examples thereof include saturated aliphatic hydrocarbons such as n-pentane, isopentane, n-hexane, n-heptane, and isooctane; saturated alicyclic hydrocarbons such as cyclopentane, cyclohexane, and methylcyclopentane; and aromatic hydrocarbons such as benzene, toluene, and xylene. These may be used alone or in combination of two or more thereof. The amount of the solvent used is not particularly limited.

The Lewis base has a role of controlling the microstructure in the structural unit derived from farnesene and the structural unit derived from a conjugated diene other than farnesene. Examples of the Lewis base include ether compounds such as dibutyl ether, diethyl ether, tetrahydrofuran, dioxane, ethylene glycol diethyl ether, and ditetrahydrofurylpropane; pyridine; tertiary amines such as N,N,N',N'-tetramethylethylenediamine, and trimethylamine; alkali metal alkoxides such as potassium t-butoxide; and phosphine compounds. When a Lewis base is used, the amount thereof is usually preferably in the range of 0.01 to 1000 molar equivalents with regard to 1 mol of the anionic polymerization initiator.

The temperature of the polymerization reaction is usually in the range of −80 to 150° C., preferably 0 to 100° C., and more preferably 10 to 90° C. The type of the polymerization reaction may be a batch type or a continuous type. The block copolymer (P) can be produced by continuously or intermittently supplying each monomer to the polymerization reaction solution so that the amount of the aromatic vinyl compound, farnesene and/or conjugated diene other than farnesene present in the polymerization reaction system falls within a specific range, or by sequentially polymerizing each monomer in the polymerization reaction solution so that each monomer has a specific ratio.

The polymerization reaction can be terminated by adding an alcohol such as methanol or isopropanol as a polymerization terminator. The block copolymer (P) can be isolated by pouring the obtained polymerization reaction solution into a poor solvent such as methanol to precipitate the block copolymer (P), or by washing the polymerization reaction solution with water, followed by separation and drying.

In the present polymerization step, an unmodified block copolymer (P) may be obtained as described above, but a modified block copolymer (P) may be obtained by introducing a functional group into the block copolymer (P) before the hydrogenation step described later. Examples of the functional group that can be introduced include an amino group, an alkoxysilyl group, a hydroxy group, an epoxy group, a carboxy group, a carbonyl group, a mercapto group, an isocyanate group, a chloro group, and an acid anhydride.

Examples of the modifying method of the block copolymer (P) include a method of adding a modifying agent such as tin tetrachloride, tetrachlorosilane, dichlorodimethylsilane, dimethyldiethoxysilane, tetramethoxysilane, tetraethoxysilane, 3-aminopropyltriethoxysilane, tetraglycidyl-1, 3-bisaminomethylcyclohexane, 2,4-tolylene diisocyanate, 4,4'-bis(diethylamino)benzophenone, and N-vinylpyrrolidone, or other modifying agents described in JP 2011-132298 A, which can react with a polymerization active terminal, before adding a polymerization terminator. The isolated copolymer may be grafted with maleic anhydride or the like before use.

The position at which the functional group is introduced may be a polymerization terminal or a side chain of the block copolymer (P). These functional groups may be used alone or in combination of two or more thereof. Usually, the amount of the modifying agent is preferably in the range of 0.01 to 10 molar equivalents with respect to the anionic polymerization initiator.

[Hydrogenation Step]

The hydrogenated block copolymer (A) can be obtained by subjecting the block copolymer (P) or the modified block copolymer (P) obtained by the above method to a step of hydrogenation. As the hydrogenation method, a known method can be used. For example, the hydrogenation reaction is carried out in the presence of a Ziegler-based catalyst; a nickel, platinum, palladium, ruthenium or rhodium metal catalyst supported on carbon, silica, diatomaceous earth or the like; an organometallic complex having a cobalt, nickel, palladium, rhodium or ruthenium metal, or the like as a hydrogenation catalyst in a solution prepared by dissolving the block copolymer (P) in a solvent which does not affect the hydrogenation reaction. In the hydrogenation step, the hydrogenation reaction may be carried out by adding a hydrogenation catalyst to a polymerization reaction solution containing the block copolymer (P) obtained by the above-described method for producing the block copolymer (P). In the present invention, palladium carbon in which palladium is supported on carbon is preferable.

In the hydrogenation reaction, the hydrogen pressure is preferably 0.1 to 20 MPa, the reaction temperature is preferably 100 to 200° C., and the reaction time is preferably 1 to 20 hours.

The hydrogenation rate of the carbon-carbon double bond in the polymer block (b) is preferably 70 to 100 mol %, more preferably 80 to 100 mol %, and still more preferably 85 to 100 mol %, from the viewpoint of obtaining a thermoplastic elastomer composition excellent in flexibility and molding processability. The hydrogenation rate can be calculated by measuring the $^1$H-NMR of the block copolymer (P) and the hydrogenated block copolymer (A) after hydrogenation.

<Thermoplastic Elastomer Composition Constituting Adhesive Layer (Y)>

The adhesive layer (Y) of the present invention may be composed of only the hydrogenated block copolymer (A), or may be composed of a thermoplastic elastomer composition composed of the hydrogenated block copolymer (A) and other components such as a polar group-containing polymer (B).

[Polar Group-Containing Polymer (B)]

The thermoplastic elastomer composition may contain a polar group-containing polymer (B). By containing the polar group-containing polymer (B), the adhesive layer (Y) has both appropriate flexibility and molding processability, and can strongly adhere to ceramics, metals, resins, concrete, asphalt and the like without primer treatment or the like.

The reason why the adhesive force is improved by using the polar group-containing polymer (B) is considered to be that the thermoplastic elastomer composition containing the polar group-containing polymer (B) is easily compatible with base materials such as ceramics, metals and resins, and when the adherend has a polar group, a chemical bond is formed between the polar group contained in the polar group-containing polymer (B) and the polar group on the surface of the adherend.

The olefin constituting the polar group-containing polymer (B) is preferably an olefin having 2 to 10 carbon atoms, and more preferably an olefin having 2 to 8 carbon atoms. Examples of such an olefin include ethylene, propylene, 1-butene, 1-pentene, 1-hexene, 1-octene, 4-methyl-1-pentene, and cyclohexene. These olefins may be used alone, or may be a copolymer obtained by combining two or more kinds thereof. Among these, ethylene and propylene are preferable, and propylene is more preferable.

Examples of the polar group contained in the polar group-containing polymer (B) include a (meth)acryloyloxy group; a hydroxy group; an amide group; an amino group; a halogen atom such as a chlorine atom; a carboxy group; an ester group; and an acid anhydride group. Among these, a (meth)acryloyloxy group, a carboxy group, an ester group, and an acid anhydride group are preferable from the viewpoint of improving adhesive force, and a carboxy group and an acid anhydride group are more preferable.

The polar group-containing polymer (B) can be obtained by random copolymerization, block copolymerization or graft copolymerization of an olefin and a polar group-containing copolymerizable monomer by a known method, although the production method thereof is not particularly limited. Among these, random copolymerization and graft copolymerization are preferable, and graft copolymerization is more preferable. In addition, it can also be obtained by subjecting a polyolefin-based resin to a reaction such as oxidation or chlorination by a known method. Further, it can also be produced by reacting a polar group-containing compound with a commercially available polyolefin to modify it.

Examples of the polar group-containing copolymerizable monomer include vinyl acetate, vinyl chloride, ethylene oxide, propylene oxide, acrylamide, and unsaturated carboxylic acids or esters or acid anhydrides thereof. Among them, unsaturated carboxylic acids or esters or acid anhydrides thereof are preferable. Examples of the unsaturated carboxylic acid or an ester or acid anhydride thereof include (meth)acrylic acid, a (meth)acrylic acid ester, maleic acid, maleic anhydride, fumaric acid, itaconic acid, itaconic anhydride, himic acid, and himic anhydride. Among them, maleic acid and maleic anhydride are more preferable. These polar group-containing copolymerizable monomers may be used alone, or two or more kinds thereof may be used in combination.

Specific examples of the (meth)acrylic acid ester exemplified as the polar group-containing copolymerizable monomer include alkyl acrylates such as methyl acrylate, ethyl acrylate, n-propyl acrylate, isopropyl acrylate, n-butyl acrylate, isobutyl acrylate, n-hexyl acrylate, isohexyl acrylate, n-octyl acrylate, isooctyl acrylate, and 2-ethylhexyl acrylate; and alkyl methacrylates such as methyl methacrylate, ethyl methacrylate, n-propyl methacrylate, isopropyl methacrylate, n-butyl methacrylate, isobutyl methacrylate, n-hexyl methacrylate, isohexyl methacrylate, n-octyl methacrylate, isooctyl methacrylate, and 2-ethylhexyl methacrylate. These (meth)acrylic acid esters may be used alone, or two or more kinds thereof may be used in combination.

The polar group-containing polymer (B) is preferably a polyolefin containing a carboxy group or an acid anhydride group as a polar group, that is, a carboxylic acid-modified olefin-based polymer or a carboxylic acid anhydride-modified olefin-based polymer is preferable, and a maleic acid-modified olefin-based polymer or a maleic anhydride-modified olefin-based polymer is more preferable from the viewpoint of improving adhesiveness.

The polar group contained in the polar group-containing polymer (B) may be post-treated after polymerization. For example, a (meth)acryloyloxy group or a carboxy group may be neutralized with a metal ion to form an ionomer, or may be esterified with methanol, ethanol, or the like. In addition, vinyl acetate may be hydrolyzed or the like.

The melt flow rate (MFR) of the polar group-containing polymer (B) under conditions of 230° C. and a load of 2.16 kg (21 N) is preferably 0.1 to 300 g/10 min, more preferably 0.1 to 100 g/10 min, still more preferably 0.1 to 80 g/10 min, and yet still more preferably 0.1 to 50 g/10 min. When the MFR of the polar group-containing polymer (B) under the above conditions is 0.1 g/10 min or more, good molding processability can be obtained. On the other hand, when the MFR is 300 g/10 min or less, mechanical properties are easily exhibited.

The melting point of the polar group-containing polymer (B) is preferably 100° C. or higher, more preferably 110 to 170° C., and still more preferably 120 to 145° C., from the viewpoint of heat resistance.

The amount of the polar group-containing structural unit contained in the polar group-containing polymer (B) is preferably 0.01 to 10% by mass in the total structural units. When the content is 0.01% by mass or more, the adhesiveness to ceramics or the like is further improved. When the proportion of the polar group-containing structural unit is 10% by mass or less, the affinity with the hydrogenated block copolymer (A) is improved, the mechanical properties become good, and the obtained thermoplastic elastomer composition becomes excellent in flexibility and molding processability. The proportion is more preferably 0.01 to 7% by mass, and still more preferably 0.01 to 5% by mass. A polyolefin-based resin containing a polar group-containing structural unit at a high concentration diluted with a polyolefin-based resin having no polar group-containing structural unit may be used as the polar group-containing polymer (B) so as to optimize the proportion of the polar group-containing structural unit. The total content of the polar group-containing structural unit and the olefin-derived constituent unit based on the structural unit contained in the polar group-containing polymer (B) is preferably 80% by mass or more, more preferably 90% by mass or more, still more preferably 95% by mass or more, and yet still more preferably 100% by mass.

The content of the polar group-containing polymer (B) in the thermoplastic elastomer composition is preferably 5 to 100 parts by mass with respect to 100 parts by mass of the hydrogenated block copolymer (A). When the content of the polar group-containing polymer (B) is at least the above lower limit value, it becomes possible to strongly adhere to ceramics and the like. On the other hand, when the content of the polar group-containing polymer (B) is the above upper limit value or less, sufficient adhesiveness can be obtained, and flexibility and molding processability are also improved. From this viewpoint, the content of the polar group-containing polymer (B) is preferably 10 to 90 parts by mass, and more preferably 15 to 80 parts by mass, per 100 parts by mass of the hydrogenated block copolymer (A).

[Softening Agent]

The thermoplastic elastomer composition may further contain a softening agent as long as the effects of the present invention are not impaired. As the softening agent, a softening agent generally used for rubbers and plastics can be used. Examples thereof include paraffin-based, naphthene-based, aromatic-based process oils; phthalic acid derivatives such as dioctyl phthalate and dibutyl phthalate; white oils; mineral oils; liquid cooligomers of ethylene and α-olefins; liquid paraffins; polybutene; low molecular weight polyisobutylene; liquid polydienes such as liquid polybutadiene, liquid polyisoprene, liquid polyisoprene/butadiene copolymer, liquid styrene/butadiene copolymer, and liquid styrene/isoprene copolymer; and hydrogenated products thereof. Among them, from the viewpoint of compatibility with the hydrogenated block copolymer (A), a paraffin-based process oil; a liquid cooligomer of ethylene and an α-olefin; liquid paraffin; low molecular weight polyisobutylene; and a hydrogenated product thereof are preferable, and a hydrogenated product of a paraffin-based process oil is more preferable.

Further, known softening agents generally used in combination with polyvinyl acetal resins, for example, organic acid ester-based plasticizers such as monobasic organic acid esters and polybasic organic acid esters; and phosphoric acid-based plasticizers such as organic phosphoric acid esters and organic phosphorous acid esters can also be used.

Examples of the monobasic organic acid ester include glycol-based esters obtained by reacting glycols such as triethylene glycol, tetraethylene glycol, and tripropylene glycol represented by triethylene glycol-dicaproic acid ester, triethylene glycol-di-2-ethylbutyric acid ester, triethylene glycol-di-n-octylic acid ester, and triethylene glycol-di-2-ethylhexylic acid ester with monobasic organic acids such as butyric acid, isobutyric acid, caproic acid, 2-ethylbutyric acid, heptylic acid, n-octylic acid, 2-ethylhexylic acid, pelargonic acid (n-nonylic acid), and decylic acid.

Examples of the polybasic acid organic ester include esters of polybasic organic acids such as adipic acid, sebacic acid, and azelaic acid represented by dibutyl sebacate, dioctyl azelate, and dibutyl carbitol adipate with linear or branched alcohols.

Examples of the organic phosphoric acid ester include tributoxyethyl phosphate, isodecylphenyl phosphate, and triisopropyl phosphate.

The softening agent may be used alone, or two or more kinds thereof may be used in combination.

When the thermoplastic elastomer composition contains a softening agent, the content thereof is preferably in the range of 0.1 to 100 parts by mass with respect to 100 parts by mass of the hydrogenated block copolymer (A). When the amount of the softening agent is within this range, the flexibility and molding processability of the thermoplastic elastomer composition are further improved. From this point of view, the content of the softening agent is more preferably 1 to 90 parts by mass with respect to 100 parts by mass of the hydrogenated block copolymer (A).

[Other Optional Components]

The adhesive layer (Y) may contain other thermoplastic polymers, inorganic fillers, tackifier resins, antioxidants, lubricants, light stabilizers, processing aids, colorants such as pigments and dyes, flame retardants, antistatic agents, matting agents, silicone oils, antiblocking agents, ultraviolet absorbers, release agents, foaming agents, antibacterial agents, antifungal agents, and perfumes, if necessary, within a range that does not impair the effects of the present invention.

Examples of the other thermoplastic polymer include an olefin-based polymer having no polar group, a styrene-based polymer, a polyphenylene ether-based resin, and polyethylene glycol. Among these, from the viewpoint of improving molding processability of the adhesive layer (Y), an olefin-based polymer having no polar group is preferable. Examples of the olefin-based polymer having no polar group include polyethylene, polypropylene, polybutene, block copolymers and random copolymers of propylene and other α-olefins such as ethylene and 1-butene, which may be used alone or in combination of two or more thereof.

In a case where the other thermoplastic polymer is contained, the content thereof is preferably 100 parts by mass or less, more preferably 50 parts by mass or less, more preferably 20 parts by mass or less, and still more preferably 10 parts by mass or less with respect to 100 parts by mass of the hydrogenated block copolymer (A).

The inorganic filler can be contained for the purpose of improving physical properties such as heat resistance and weather resistance of the adhesive layer (Y), adjusting hardness, and improving economical efficiency as an extender. Examples of the inorganic filler include calcium carbonate, talc, magnesium hydroxide, aluminum hydroxide, mica, clay, natural silicic acid, synthetic silicic acid, titanium oxide, carbon black, barium sulfate, glass balloon, and glass fiber.

The inorganic filler may be used alone, or two or more kinds thereof may be used in combination.

When the inorganic filler is contained, the content thereof is preferably within a range in which the flexibility of the thermoplastic elastomer composition is not impaired, and is preferably 100 parts by mass or less, more preferably 70 parts by mass or less, still more preferably 30 parts by mass or less, and particularly preferably 10 parts by mass or less with respect to 100 parts by mass of the hydrogenated block copolymer (A).

Examples of the tackifier resin include rosin-based resins, terpene phenol resins, terpene resins, aromatic hydrocarbon-modified terpene resins, aliphatic-based petroleum resins, alicyclic-based petroleum resins, aromatic-based petroleum resins, coumarone-indene resins, phenol-based resins, and xylene resins.

In a case where the tackifier resin is contained, the content thereof is preferably within a range in which the mechanical properties of the thermoplastic elastomer composition are not impaired, and is preferably 100 parts by mass or less, more preferably 70 parts by mass or less, and still more preferably 30 parts by mass or less with respect to 100 parts by mass of the hydrogenated block copolymer (A).

Examples of the antioxidant include hindered phenol-based, phosphorus-based, lactone-based and hydroxy-based antioxidants. Among these, a hindered phenol-based antioxidant is preferable. When the antioxidant is contained, the content thereof is preferably within a range in which the obtained thermoplastic elastomer composition is not colored during melt-kneading, and is preferably 0.1 to 5 parts by mass with respect to 100 parts by mass of the hydrogenated block copolymer (A).

The method for producing the thermoplastic elastomer composition used in the adhesive layer (Y) is not particularly limited, and any method may be used as long as the hydrogenated block copolymer (A), the polar group-containing polymer (B) used as necessary, and other components can be uniformly mixed. In the case of melt-kneading, for example, melt-kneading can be performed using a melt-kneading apparatus such as a single-screw extruder, a twin-screw extruder, a kneader, a batch mixer, a roller, or a Banbury mixer, and the thermoplastic elastomer composition can be obtained by melt-kneading preferably at 170 to 270° C.

[Base Material (X) and Base Material (Z)]

The multilayer body of the present invention has a base material (X) and a base material (Z).

Examples of the base material (X) and the base material (Z) each independently include at least one selected from metals, polar resins, polyolefin resins, carbon fibers, artificial leather, glass, ceramics, and the like, and both base materials may be made of the same material.

Examples of the metal that can be used for the base material (X) and the base material (Z) include iron, copper, aluminum, magnesium, nickel, chromium, zinc, and alloys such as stainless steel containing these as components. In addition, it may have a metal surface formed by plating such as copper plating, nickel plating, chromium plating, tin plating, zinc plating, platinum plating, gold plating, or silver plating.

Examples of the polar resin that can be used for the base material (X) and the base material (Z) include polyamide resins, polyester resins, polycarbonate resins, polyphenylene sulfide resins, (meth)acrylonitrile-butadiene-styrene resins (ABS), (meth)acrylonitrile-styrene resins, (meth)acrylate-butadiene—styrene resins, (meth)acrylate-styrene resins, butadiene-styrene resins, epoxy resins, phenol resins, diallyl phthalate resins, polyimide resins, melamine resins, polyacetal resins (POM), polysulfone resins, polyethersulfone resins, polyetherimide resins, polyphenylene ether resins, polyarylate resins, polyether ether ketone resins, polystyrene resins, syndiotactic polystyrene resins, and polyurethanes (thermoplastic and thermosetting). These resins may be used alone, or two or more kinds thereof may be used in combination. In addition, these resins may be reinforced with glass fibers or carbon fibers. Preferable examples of the polyamide resin include polyamide 6 (PA6) and polyamide 66 (PA66). As the polyester resin, polylactic acid (PLA), polyethylene terephthalate (PET), polybutylene terephthalate (PBT) and the like are preferable.

Examples of the polyolefin resin that can be used for the base material (X) and the base material (Z) include polyethylene, polypropylene, polybutene-1, polyhexene-1, poly-3-methyl-butene-1, poly-4-methyl-pentene-1, copolymers of ethylene and one or more α-olefins having 3 to 20 carbon atoms (e.g., propylene, 1-butene, 1-pentene, 1-hexene, 1-heptene, 1-octene, 1-decene, 3-methyl-1-butene, 4-methyl-1-pentene, 6-methyl-1-heptene, isooctene, isooctadiene, decadiene, etc.), ethylene/propylene/diene copolymers (EPDM), ethylene-vinyl acetate copolymers, ethylene-acrylic acid copolymers, etc., and cycloolefin (co)polymers such as ethylene-norbornene copolymers are also preferable. In addition, these resins may be reinforced with glass fibers or carbon fibers.

The ceramics which can be used for the base material (X) and the base material (Z) are not particularly limited as long as they are non-metallic inorganic materials, and examples thereof include metal oxides, metal carbides, and metal nitrides. Specific examples thereof include glass, cements, alumina, zirconia, zinc oxide-based ceramics, barium titanate, lead zirconate titanate, silicon carbide, silicon nitride, and ferrites.

Among these, the base material (X) and the base material (Z) are preferably metals such as copper, aluminum and stainless steel, polar resins such as polyacetal resin (POM) and polyamide 6 (PA6), polyester resins such as polybutylene terephthalate, polycarbonate resins, (meth)acrylonitrile-styrene resins (AS), (meth)acrylonitrile-butadiene-styrene resins (ABS), and polyolefin resins such as polyethylene and polypropylene from the viewpoint of adhesiveness to the adhesive layer (Y).

The multilayer body of the present invention may have a base material other than the base material (X) and the base material (Z), or an adhesive layer (Y), but is preferably a multilayer body in which only the base material (X), the adhesive layer (Y), and the base material (Z) are laminated.

The thicknesses of the base material (X) and the base material (Z) are not particularly limited, but in the case of the following "first production method", "second production method", "third production method", and "fifth production method", the respective thicknesses of the base material (X) and the base material (Z) are preferably 0.01 to 5.00 mm, more preferably 0.03 to 3.00 mm, particularly preferably 0.04 to 2.00 mm, and most preferably 0.05 to 1.00 mm. On the other hand, in the case of the "fourth production method", the thickness of the base material (X) is preferably 0.01 to 1.00 mm, more preferably 0.02 to 0.50 mm, particularly preferably 0.03 to 0.40 mm, and most preferably 0.03 to 0.03 mm, and the thickness of the base material (Z) is preferably 0.01 to 5.00 mm, more preferably 0.03 to 3.00 mm, particularly preferably 0.04 to 2.00 mm, and most preferably 0.05 to 1.00 mm. When the thicknesses of the base material (X) and the base material (Y) are in the above-described ranges, it becomes easier to maintain the interlayer adhesive force of the multilayer body of the present invention at a high level, which is preferable.

The surface roughness of the base material (X) and the base material (Z) is not particularly limited, but when the base material (X) and the base material (Z) are a polar material (for example, a polar resin, a metal, or the like), a smaller arithmetic average roughness (Ra) tends to exhibit a higher adhesive force. Therefore, the arithmetic average roughness (Ra) in this case is preferably 0.010 to 10 μm, more preferably 0.010 to 1 μm, still more preferably 0.010 to 0.500 μm, particularly preferably 0.010 to 0.300 μm, and most preferably 0.010 to 0.200 μm.

On the other hand, when the base material (X) and the base material (Z) are a non-polar material (for example, a polyolefin resin, or the like), there is a tendency that a higher arithmetic average roughness (Ra) indicates a higher adhesive force. Therefore, the arithmetic average roughness (Ra) in this case is preferably 0.010 to 10 μm, more preferably 0.100 to 7 μm, and particularly preferably 0.200 to 6 μm. The above range is preferable because the shear adhesive force of 10 N/cm$^2$ or more can be more easily exhibited.

In the present invention, the arithmetic surface roughness (Ra) is a value measured in accordance with JIS B 0601-2001, and specifically, a value measured according to the method described in Examples.

[2] Production Method of Multilayer Body

[First Production Method]

A first production method of the multilayer body of the present invention includes a step (I-a) of press-molding the adhesive layer (Y) onto the base material (X); and a step (II-a) of injection-molding the base material (Z) onto the adhesive layer (Y) after the step (I-a).

In the first production method, since the step (I-a) of press-molding and the step (II-a) of injection-molding are used in combination, it is possible to strongly bond a resin which could not be bonded so far, for example, a polyacetal resin (POM) and a stainless steel plate or the like. In particular, in the case where the hydrogenated block copolymer (A) constituting the adhesive layer (Y) has a farnesene block, the adhesive layer (Y) becomes soft, so that the adhesiveness is further improved.

<Step (I-a)>

The step (I-a) in the first production method is a step of press-molding the adhesive layer (Y) onto the base material (X).

There are no particular restrictions on the conditions for press-molding, but after laminating the adhesive layer (Y) onto the base material (X), the base material (X) and the adhesive layer (Y) can be bonded to each other by compressing at a temperature of preferably 100 to 220° C., and more preferably 120 to 200° C., and a load of preferably 10 to 100 kgf/cm$^2$, more preferably 10 to 50 kgf/cm$^2$, and still more preferably 15 to 40 kgf/cm$^2$, for preferably 1 to 10 minutes, and more preferably 1 to 5 minutes.

<Step (II-a)>

The step (II-a) is a step of injection-molding the base material (Z) onto the adhesive layer (Y) after the step (I-a).

The method for injection-molding the base material (Z) onto the adhesive layer (Y) is not particularly restricted, but it is preferable to injection-mold the base material (Z) at a die temperature of preferably 190 to 360° C., and more preferably 200 to 330° C., and a cylinder temperature for injecting the resin constituting the base material (Z) of preferably 40 to 160° C., and more preferably 45 to 150° C.

[Second Production Method]

A second production method of the multilayer body of the present invention includes a step (I-b) of forming the adhesive layer (Y) by applying a solution and/or an aqueous emulsion containing the hydrogenated block copolymer (A) onto the base material (X) and then drying the solution and/or the aqueous emulsion; and a step (II-b) of injection-molding the base material (Z) onto the adhesive layer (Y) after the step (I-b).

In the second production method, since the adhesive layer (Y) can be formed by applying a solution and/or an aqueous emulsion containing the hydrogenated block copolymer (A) onto the base material (X) and drying the applied solution and/or aqueous emulsion, a multilayer body can be produced relatively easily.

<Step (I-b)>

The step (I-b) is a step of forming the adhesive layer (Y) by applying a solution and/or an aqueous emulsion containing the thermoplastic elastomer composition onto the base material (X) and then drying the applied solution and/or aqueous emulsion.

In the step (I-b), first, a solution and/or an aqueous emulsion containing the thermoplastic elastomer composition is prepared. Specifically, the thermoplastic elastomer composition is dissolved or dispersed in an organic solvent or water by a known method.

In the case of obtaining an aqueous emulsion, examples thereof include methods using a homogenizer, a homomixer, a disperser mixer, a colloid mill, a pipeline mixer, a high-pressure homogenizer, an ultrasonic emulsifier, and the like, and these can be used alone or in combination.

To the aqueous emulsion used in the present invention, various additives may be further added depending on the application as long as the effects of the present invention are not impaired.

Examples of the additive include an anionic surfactant, a cationic surfactant, a nonionic surfactant, a filler, a modifier, and a pigment. However, if the surfactant is added too much, the resistance of the thin molded body may be impaired, and therefore it is necessary to limit the amount thereof to a necessary minimum amount.

The content of the thermoplastic elastomer composition in the solution and/or aqueous emulsion containing the thermoplastic elastomer composition is preferably 5 to 50% by mass, more preferably 10 to 40% by mass, and still more preferably 15 to 30% by mass.

After the solution or aqueous emulsion is prepared by the above method, the solution or aqueous emulsion is applied to the base material (X) by one or more methods selected from, for example, coating, dipping, nozzle (spray) coating, brush coating, and the like.

Then, the adhesive layer (Y) can be formed, for example, by drying under conditions of preferably 30 to 80° C., more preferably 40 to 70° C., and preferably for 15 minutes to 2 hours, more preferably for 20 minutes to 1 hour.

<Step (II-b)>

The step (II-b) in the second production method is a step of injection-molding the base material (Z) onto the adhesive layer (Y) after the step (I-b). A preferred embodiment in which the base material (Z) is injection-molded onto the adhesive layer (Y) is the same as the conditions described in the step (II-a) in the first production method.

[Third Production Method]

A third production method of the multilayer body of the present invention includes a step (I-c) of press-molding the adhesive layer (Y) onto the base material (X); and a step (II-c) of press-molding the base material (Z) onto the adhesive layer (Y) after the step (I-c).

In the third production method, since press-molding is performed twice in total in the step (I-c) and the step (II-c), the base material (X), the adhesive layer (Y), and the base material (Z) can be strongly bonded to each other.

<Step (I-c)>

The step (I-c) in the third production method is a step of press-molding the adhesive layer (Y) onto the base material (X), and a preferred embodiment is the same as the conditions described in the step (I-a) in the first production method.

<Step (II-c)>

The step (II-c) in the third production method is a step of press-molding the base material (Z) onto the adhesive layer (Y) after the step (I-c). A preferred embodiment in which the base material (Z) is press-molded onto the adhesive layer (Y) is the same as the conditions described in the step (I-a) in the first production method.

[Fourth Production Method]

A fourth production method of the multilayer body of the present invention includes a step (I-d) of co-extruding the base material (X) and the adhesive layer (Y); and a step (II-d) of press-molding the base material (Z) onto the adhesive layer (Y) after the step (I-d).

In the fourth production method, since the base material (X) and the adhesive layer (Y) are strongly bonded by co-extrusion in the step (I-d) and press-molding is further performed in the step (II-d), the base material (X), the adhesive layer (Y) and the base material (Z) can also be strongly bonded as a whole.

<Step (I-d)>

The step (I-d) in the fourth production method is a step of co-extruding the base material (X) and the adhesive layer (Y).

The co-extrusion method is not particularly limited, and examples thereof include a method using a film-forming apparatus such as a T-die extrusion molding machine or an inflation molding machine.

The set temperature of the barrel on the base material (X) side during the co-extrusion is preferably 150 to 250° C., and the set temperature of the barrel on the base material (Y) side is preferably 140 to 240° C. In the case of T-die extrusion molding, the temperature of the T-die is more preferably 130 to 230° C.

<Step (II-d)>

The step (II-d) in the fourth production method is a step of press-molding the base material (Z) onto the adhesive layer (Y) after the step (I-d). A preferred embodiment in which the base material (Z) is press-molded onto the adhesive layer (Y) is the same as the conditions described in the step (I-a) in the first production method.

[Fifth Production Method]

A fifth production method of the multilayer body of the present invention includes a step (I-e) of injection-molding the adhesive layer (Y) onto the base material (X); and a step (II-e) of injection-molding the base material (Z) onto the adhesive layer (Y) after the step (I-e).

In the fifth production method, since injection-molding is performed twice while taking advantage of the characteristics of the adhesive layer (Y), it is possible to strongly bond the base materials to each other, which could not be bonded by a conventional method.

<Step (I-e)>

The step (I-e) in the fifth production method is a step of injection-molding the adhesive layer (Y) onto the base material (X). A preferred embodiment in which the adhesive layer (Y) is injection-molded onto the base material (X) is the same as the conditions described in the step (II-a) in the first production method.

<Step (II-e)>

The step (II-e) in the fifth production method is a step of injection-molding the base material (Z) onto the adhesive layer (Y) after the step (I-e). A preferred embodiment in which the base material (Z) is injection-molded onto the adhesive layer (Y) is the same as the conditions described in the step (II-a) in the first production method.

In the production methods of the present invention, the base material (X) and the base material (Z) are not limited in any production method, but it is preferable that the base material (X) is a metal and the base material (Z) is a polar resin or a polyolefin resin from the viewpoint of more strongly bonding both base materials.

[Application of Multilayer Body]

The multilayer body of the present invention can be widely applied to various applications. For example, synthetic resins, synthetic resins containing glass fibers, and light metals such as aluminum and magnesium alloys are used for housing materials of electronic and electrical equipment, office automation equipment, household electrical equipment, automobile members, and the like, and the multilayer body of the present invention can be used for these housing materials. More specifically, the multilayer body of the present invention is preferably bonded to a housing of a large-sized display, a notebook personal computer, a portable telephone, a PHS, a PDA (a portable information terminal such as an electronic notebook), an electronic dictionary, a video camera, a digital still camera, a portable radio cassette player, an inverter or the like, and is preferably used as a shock absorbing material, a covering material having an anti-slip function, a waterproof material, a design material or the like.

In addition, it is useful in a wide range of applications as a molded body or a structure bonded to glass such as a window molding or a gasket of an automobile or a building, a sealing material for glass, an antiseptic corrosion material, etc. Further, it can be suitably used as a sealant for a joint portion between glass and an aluminum sash or a metal opening in a window of an automobile or a building, a joint portion between glass and a metal frame in a solar cell module or the like, or the like. Furthermore, it can be suitably used for separators of secondary batteries used in various information terminal devices such as notebook personal computers, mobile phones, and video cameras, hybrid vehicles, fuel cell vehicles, and the like.

EXAMPLES

Hereinafter, the present invention will be described with reference to Examples, but the present invention is not limited to these Examples. β-farnesene (purity: 97.6% by mass, manufactured by Amyris, Inc.) was purified with a 3 Å molecular sieve and distilled under a nitrogen atmosphere to remove hydrocarbon-based impurities such as zingiberene, bisabolene, farnesene epoxide, farnesol isomers, E,E-farnesol, squalene, ergosterol, and several dimers of farnesene, and used in the following polymerization.

Components used in Examples and Comparative Examples are as follows.

<Hydrogenated Block Copolymer (A)>

Production Example 1: Production of Hydrogenated Block Copolymer (A-1)

A hydrogenated block copolymer (A-1) was produced by the method described in Production Example 6 of JP 2018-024776 A, except that the mix proportion was as shown in Table 1 below. Specifically, the details are as follows.

A nitrogen-purged and dried pressure-resistant container was charged with 50.0 kg of cyclohexane as a solvent, 190.5 g of sec-butyllithium (10.5% by mass cyclohexane solution) as an anionic polymerization initiator, and 0.40 kg of tetrahydrofuran as a Lewis base, heated to 50° C., added with 6.34 kg of β-farnesene and polymerized for 2 hours, subsequently added with 2.50 kg of styrene (1) and polymerized for 1 hour, and further added with 3.66 kg of butadiene and polymerized for 1 hour. Subsequently, 0.02 kg of dichlorodimethylsilane was added as a coupling agent to this polymerization reaction solution and reacted for 1 hour, thereby obtaining a reaction solution containing a poly(β-farnesene)-polystyrene-polybutadiene-polystyrene-poly(β-farnesene) pentablock copolymer (hereinafter referred to as "block copolymer (P1)"). To this reaction solution, palladium carbon (supported amount of palladium: 5% by mass) as a hydrogenation catalyst was added in an amount of 5% by mass to the block copolymer (P1), and the reaction was carried out for 10 hours under the condition of a hydrogen pressure of 2 MPa and 150° C. After cooling and pressure release, palladium carbon was removed by filtration, and the filtrate was concentrated and further dried under vacuum, thereby obtaining a hydrogenated product (A-1) of a poly (β-farnesene)-polystyrene-polybutadiene-polystyrene-poly (β-farnesene) pentablock copolymer (hereinafter referred to as "hydrogenated block copolymer (A-1)"). The obtained hydrogenated block copolymer (A-1) was a mixture containing 90% by mass of a hydrogenated product of a poly(β-farnesene)-polystyrene-polybutadiene-polystyrene-poly(β-farnesene) pentablock copolymer and 10% by mass of a hydrogenated product of a polybutadiene-polystyrene-poly(β-farnesene) triblock copolymer. For the obtained hydrogenated block copolymer (A-1), the above-mentioned physical properties were measured. The results are shown in Table 1.

Production Example 2: Production of Hydrogenated Block Copolymer (A-2)

A hydrogenated block copolymer (A-2) was produced by the method described in Example 1 of WO 2019/103048 A, except that the mix proportion was as shown in Table 1 below. Specifically, the details are as follows.

A nitrogen-purged and dried pressure-resistant container was charged with 50 kg of cyclohexane as a solvent, and 87 g of a cyclohexane solution of sec-butyllithium having a concentration of 10.5% by mass as an anionic polymerization initiator (substantial addition amount of sec-butyllithium: 9.1 g).

After the inside of the pressure-resistant container was heated to 50° C., 1.0 kg of styrene (1) was added and polymerized for 1 hour, 63 g of 2,2-di(2-tetrahydrofuryl)propane (DTHFP) was added as a Lewis base at a container inside temperature of 50° C., a liquid mixture of 8.16 kg of isoprene and 6.48 kg of butadiene was added over 5 hours and polymerized for 2 hours, and 1.0 kg of styrene (2) was further added and polymerized for 1 hour, thereby obtaining a reaction solution containing a polystyrene-poly(isoprene/butadiene)-polystyrene triblock copolymer.

A Ziegler-based hydrogenation catalyst formed from nickel octanoate and trimethylaluminum was added to the reaction solution in a hydrogen atmosphere, and the reaction was performed under the conditions of a hydrogen pressure of 1 MPa and 80° C. for 5 hours. After the reaction solution was allowed to cool and the pressure was released, the catalyst was removed by washing with water, and vacuum drying was performed to obtain a hydrogenated product (A-2) of a polystyrene-poly(isoprene/butadiene)-polystyrene triblock copolymer (hereinafter referred to as "hydrogenated block copolymer (A-2)"). The obtained (A-2) was composed of 100% by mass of a hydrogenated product of a polystyrene-poly(isoprene/butadiene)-polystyrene triblock copolymer, and substantially did not contain a hydrogenated product of a polystyrene-poly(isoprene/butadiene) diblock copolymer. For the obtained hydrogenated block copolymer (A-2), the above-mentioned physical properties were measured. The results are shown in Table 1.

Production Example 3: Production of Hydrogenated Block Copolymer (A-3)

SEBS having a molecular weight (Mp) of 66,500, a vinyl content in a diene block of 38 mol %, and a styrene content of 30% by mass, and SEB having a molecular weight (Mp) of 33,500, a vinyl content in a diene block of 38 mol %, and a styrene content of 30% by mass, were mixed so that the mass ratio [SEBS/SEB] was 3/7 to produce a hydrogenated block copolymer (A-3).

The mass ratio [(a)/(b)] of SEBS was 30/70 and the hydrogenation rate thereof was 99 mol %, the mass ratio [(a)/(b)] of SEB was 30/70 and the hydrogenation rate thereof was 99 mol %, and the content of the diblock copolymer in the hydrogenated block copolymer (A-3) was 30% by mass.

The following measurements were performed on the obtained hydrogenated block copolymers (A-1), (A-2), and (A-3). The results are shown in Table 1.

(1) Measurement of Molecular Weight Distribution, Peak Top Molecular Weight (Mp), and the Like The peak top molecular weight (Mp) and the molecular weight distribution (Mw/Mn) of the hydrogenated block copolymer were determined by gel permeation chromatography (GPC) in terms of standard polystyrene molecular weight, and the peak top molecular weight (Mp) was determined from the position of the top of the peak of the molecular weight distribution. The measuring apparatus and conditions are as follows.

The peak top molecular weight of the polymer block (a) was determined by measuring the sampled liquid after the polymerization of the polymer block (A) was completed.

Apparatus: GPC apparatus "GPC8020" (manufactured by Tosoh Corporation)
Separation column: Column "TSKgelG4000HXL" manufactured by Tosoh Corporation
Detector: "RI-8020" manufactured by Tosoh Corporation
Eluent: Tetrahydrofuran
Eluent flow rate: 1.0 mL/min
Sample concentration: 5 mg/10 mL
Column temperature: 40° C.

(2) Measurement Method of Hydrogenation Rate

In each production example, the block copolymer before hydrogenation and the block copolymer after hydrogenation (hydrogenated block copolymer) were dissolved in a deuterated chloroform solvent respectively, and $^1$H-NMR was measured at 50° C. using "Lambda-500" manufactured by JEOL Ltd. The hydrogenation rate of the polymer block (b) in the hydrogenated block copolymer (A) was calculated from the peak of protons contained in the carbon-carbon double bond appearing at 4.5 to 6.0 ppm in the obtained spectrum according to the following formula.

Hydrogenation rate={1−(number of moles of carbon-carbon double bonds contained per mole of block copolymer after hydrogenation)/(number of moles of carbon-carbon double bonds contained per mole of block copolymer before hydrogenation)}×100(mol %).

TABLE 1

|  |  |  | Production Example 1 A-1 | Production Example 2 A-2 |
|---|---|---|---|---|
| Amount used (kg) | Cyclohexane |  | 50.0 | 50.0 |
|  | sec-Butyllithium |  | 0.1905 | 0.0870 |
|  | (10.5% by mass cyclohexane solution) |  |  |  |
|  | Tetrahydrofuran |  | 0.40 | — |
|  | Ditetrahydrofurylpropane (DTHFP) |  | — | 0.063 |
|  | Dichlorodimethylsilane |  | 0.02 | — |
|  | Polymer block (a) | Styrene (1) | 2.50 | 1.00 |
|  |  | Styrene (2) | — | 1.00 |
|  | Polymer block (b1) | β-farnesene | 6.34 | — |
|  | Polymer block (b2) | Butadiene | 3.66 | 6.48 |
|  |  | Isoprene | — | 8.16 |

TABLE 1-continued

|  |  | Production Example 1 A-1 | Production Example 2 A-2 |
|---|---|---|---|
| Content of polymer block (a) in block copolymer [% by mass] | | 20 | 12 |
| Mass ratio of polymer block (a) to polymer block (b) [(a)/(b)] | | 20/80 | 12/88 |
| Polymer skeleton (F: farnesene, St: styrene, Bd: butadiene, Ip: isoprene) | | F-St-Bd-St-F | St-Ip/Bd-St |
| Physical properties | Peak top molecular weight (Mp) of styrene block | 8,000 | 8,300 |
| | Peak top molecular weight (Mp) of hydrogenated block copolymer | 102,000 | 185,000 |
| | Molecular weight distribution (Mw/Mn) | 1.50 | 1.13 |
| | Hydrogenation rate [mol %] | 93.0 | 97.0 |

Examples 1 to 39 and Comparative Examples 1 to 15

The materials described in Table 2 were used, and the respective materials were laminated by the production methods described in Tables 3 to 10 to produce multilayer bodies. The procedures and conditions of the production methods described in Tables 3 to 10 are as follows.

<First Production Method ([1] Press-Molding Step, [2] Injection-Molding Step)>
(1) Production of Adhesive Layer (Y)

The hydrogenated block copolymer (A) was subjected to press-molding at 200° C. under a load of 100 kgf/cm$^2$ for 3 minutes and then press-molding at 30° C. under a load of 15 kgf/cm$^2$ for 1 minute using a compression press-molding machine "NF-37" manufactured by Shinto Metal Industries Ltd., using a Teflon (registered trademark) coated metal frame as a spacer to obtain an adhesive layer (Y) having a thickness of 1 mm.

(2) Step (I-a)

Both surfaces of the base material (X) having a length of 100 mm×a width of 35 mm×a thickness of 1 mm were washed with an aqueous surfactant solution and distilled water in this order, and dried. Thereafter, the base material (X) and the adhesive layer (Y) prepared in the above (1) were arranged in the center of a metal spacer having an outer dimension of 200 mm×200 mm, an inner dimension of 150 mm×150 mm, and a thickness of 2 mm.

The laminated base material (X) and adhesive layer (Y) were sandwiched between polytetrafluoroethylene sheets, and press-molded for 3 minutes at a load of 20 kgf/cm$^2$ (2 N/mm$^2$) under a temperature condition of 180° C. using a compression molding machine to laminate the base material (X) and the adhesive layer (Y).

(3) Step (II-a)

After the laminate of the base material (X) and the adhesive layer (Y) was set in an injection-molding machine ("EC75SX; 75 tons" manufactured by Toshiba Machine Co., Ltd.), the material constituting the base material (Z) was laminated by an injection insert molding method, thereby producing a multilayer body in which the base material (X), the adhesive layer (Y), and the base material (Z) were laminated in this order. The thickness of the base material (Z) was 2.0 mm.

<Second Production Method ([1] Coating Drying Step, [2] Injection-Molding Step)>
(1) Step (I-b)

A 25% by mass solution of the hydrogenated block copolymer (A) was prepared using cyclohexane as a solvent. The base material (X) (thickness: 1.0 mm) was coated by dipping twice in the above solution. After that, the product was dried in a gear oven at 60° C. for 30 minutes to laminate the base material (X) and the adhesive layer (Y). The thickness of the adhesive layer (Y) after drying was 0.2 mm.

(3) Step (II-a)

A multilayer body was obtained by the same method as the method described in the first production method. The thickness of the base material (Z) was 2.8 mm.

<Third Production Method ([1] Press-Molding Step, [2] Press-Molding Step)>
(1) Production of Adhesive Layer (Y)

An adhesive layer (Y) was obtained by the same method as the method described in the first production method. The thickness of the base material (Y) was 1.0 mm.

(2) Step (I-c)

The base material (X) and the adhesive layer (Y) were laminated by the same method as the method (I-a) described in the first production method. The thickness of the base material (X) was 1.0 mm.

(3) Step (II-c)

The adhesive layer (Y) and the base material (Z) were laminated by the same method as the method (I-a) described in the first production method. The thickness of the base material (Z) was 1.0 mm.

<Fourth Production Method ([1] Co-extrustion Step, [2] Press-Molding Step)>
(1) Step (I-d)

The base material (X) was supplied from a single-axis extruder having a screw diameter of 30 mm (GM30-28, manufactured by GM Engineering Co., Ltd.) and the adhesive layer (Y) was supplied from a single-axis extruder having a screw diameter of 25 mm (GM-25-25, manufactured by GM Engineering Co., Ltd.), and a film coming out from a T die (T300 hanger coat die) was wound up to obtain a co-extruded film of the base material (X) and the adhesive layer (Y). The thickness of the base material (X) was 0.03 to 0.05 mm, and the thickness of the base material (Y) was 0.005 to 0.03 mm.

(2) Step (II-d)

With respect to the co-extruded film obtained in the step (I-d), the base material (Z) was press-molded onto the adhesive layer (Y) by the same method as the method (I-a) described in the first production method. The layer configuration of the obtained multilayer body had the base material (X), the adhesive layer (Y), and the base material (Z) in this order. The thickness of the base material (Z) was 1.0 mm.

<Fifth Production Method ([1] Injection-Molding Step, [2] Injection-Molding Step)>

(1) Step (I-e)

After the base material (X) was set in an injection-molding machine ("EC75SX; 75 tons" manufactured by Toshiba Machine Co., Ltd.), the material constituting the adhesive layer (Y) was laminated by an injection insert molding method. The thickness of the base material (X) was 1.0 mm, and the thickness of the base material (Y) was 1.0 mm.

(2) Step (II-e)

Then, the material constituting the base material (Z) was laminated onto the adhesive layer (Y) laminated onto the base material (X) by an injection insert molding method, thereby producing a multilayer body in which the base material (X), the adhesive layer (Y), and the base material (Z) were laminated in this order. The thickness of the base material (Z) was 1.0 mm.

TABLE 2

| | Used material | Detail |
|---|---|---|
| Base material (X) | Stainless steel plate | SUS304 |
| | Aluminum alloy plate | A5052P |
| | GF-added polypropylene | "PG6n1" manufactured by Daicel Corporation |
| | Copper plate | C1100P |
| | Carbon fiber (CF) | "TORAYCA CLOTH C6142" manufactured by Toray Industries, Inc. |
| | Homo-polypropylene (1) | "NOBLEN WF836DG3" manufactured by Sumitomo Chemical Co., Ltd. |
| | Ethylene-norbornene copolymer (COC) | "Topas6013" manufactured by Polyplastics Co., Ltd. |
| Adhesive layer (Y) | A-1 | Hydrogenated block copolymer produced in Production Example 1 |
| | A-2 | Hydrogenated block copolymer produced in Production Example 2 |
| | A-3 | Hydrogenated block copolymer produced in Production Example 3 |
| | KRATON | "FG1901x" manufactured by Kraton Polymers Japan Ltd. |
| | SEPTON | "SEPTON 2004" manufactured by Kuraray Co., Ltd. |
| | Tufftec | "Tufftec M1911" manufactured by Asahi Kasei Corporation |
| Base material (Z) | Polyacetal resin (POM) | "DURACON M90-44" manufactured by Polyplastics Co., Ltd. |
| | Polyamide 6 (PA6) | "UBE NYLON 1013B" manufactured by UBE Corporation |
| | Polybutylene terephthalate (PBT) | "TORAYCON 1401X6" manufactured by Toray Industries, Inc. |
| | Homo-polypropylene (2) | "Prime Polypro J106G" manufactured by Prime Polymer Co., Ltd. |
| | Polyethylene (HDPE) | "Novatec HJ490" manufactured by Japan Polyethylene Corporation |
| | Polyethylene (LDPE) (1) | "EVOLUE SP1540" manufactured by Prime Polymer Co., Ltd. |
| | Polyethylene (LDPE) (2) | "STN7006" manufactured by Braskem S.A. |
| | Ethylene-norbornene copolymer (COC) | "Topas6013" manufactured by Polyplastics Co., Ltd. |
| | Carbon fiber (CF) | "TORAYCA CLOTH C6142" manufactured by Toray Industries, Inc. |
| | Polycarbonate (PC) | "Iupilon S-3000R" manufactured by Mitsubishi Engineering-Plastics Corporation |
| | ABS resin (ABS) | "TOYOLAC 700-314" manufactured by Toray Industries, Inc. |
| | GF-added polypropylene | "PG6n1" manufactured by Daicel Corporation |
| | Copper plate | C1100P |

The obtained multilayer body was evaluated as follows. The results are shown in Table 3 and Table 4.

(1) Measurement of Storage Modulus G' and Loss Modulus G" of Adhesive Layer (Y)

A disk-shaped test piece having a diameter of 8 mm and a thickness of 1 mm was cut out from the adhesive layer (Y) produced by a compression press-molding machine. This test piece was subjected to dynamic viscoelasticity measurement using an ARES-G2 rheometer (manufactured by TA Instruments) under the following conditions to measure the storage modulus (G') at 100° C. and 0° C. and the loss modulus (G") at 100° C. and 0° C.

(Dynamic Viscoelastometer and Measurement Conditions)
  Parallel plate: 8 mm in diameter
  Vibration mode: torsion vibration
  Strain amount: 0.1%
  Frequency: 1 Hz
  Measurement temperature: —70 to 200° C.
  Temperature rise rate: 3° C./min (2) Measurement of Adhesiveness The behavior of the obtained multilayer body when the base material (X) and the base material (Z) were peeled off by hand was evaluated according to the following criteria.
  1 (good): Cannot be peeled off by hand
  2 (pass): Can be forcibly peeled off by hand
  3 (failure): Can be easily peel off by hand (3) Method of Measuring Adhesive Force
<Method for Preparing Test Piece>

Both surfaces of the base material (X) having a length of 50 mm, a width of 35 mm and a thickness of 1 mm were washed with an aqueous surfactant solution and distilled water in this order, and dried. Thereafter, the base material (X) and the adhesive layer (Y) produced in "(1) Production of Adhesive Layer (Y)" in the <First Production Method [1] Press-Molding Step and [2] Injection-Molding Step> were cut into a piece of 12.5 mm in length and 35 mm in width, and the piece was arranged in the center of a metal spacer having an outer dimension of 200 mm×200 mm, an inner dimension of 150 mm×150 mm, and a thickness of 2 mm.

Then, the laminated base material (X) and adhesive layer (Y) were sandwiched between polytetrafluoroethylene sheets, and press-molded for 3 minutes at a load of 20 kgf/cm$^2$ (2 N/mm$^2$) under a temperature condition of 180° C. using a compression molding machine to laminate the base material (X) and the adhesive layer (Y).

Thereafter, a laminate of the base material (X) having a polyimide film attached to a portion where the adhesive layer (Y) is not laminated, and the adhesive layer (Y), and a jig to which the polyimide film is laminated were set in a mold of an injection-molding machine ("EC75SX; 75 tons" manufactured by Toshiba Machine Co., Ltd.), and then the material constituting the base material (Z) was laminated by an injection insert molding method to produce a multilayer body in which the base material (X), the adhesive layer (Y), and the base material (Z) were laminated in this order (see FIG. 1).

A portion of the adhesive layer (Y) and the base material (Z) of the multilayer body was cut into 12.5 mm in length and 25 mm in width to prepare a test piece (see FIG. 2, wherein FIG. 2 is a view of the multilayer body seen from the base material (Z) side).

<Method of Measuring Adhesive Force>

The base material layer (X) and base material layer (Z) portions of the test piece were gripped, and the adhesive force was measured when the test piece was moved at a rate of 2 mm/min at room temperature of 23° C. using a tensile tester (3345 manufactured by Instron Corporation).

<Surface Roughness of Base Material>

The surface of the base material was measured using Surfcorder SE1700a (manufactured by Kosaka Laboratory Ltd.) under the following measurement conditions in accordance with JIS B 0601-2001. The measured values of the surface roughness of the base material are shown only in Table 10.

(Measurement Conditions)
  Stylus R: 2 μm
  Feed speed: 0.500 mm/s
  Cutoff: λc=0.800 mm
  Measurement length: 4.000 mm
  Filter: GAUSS (ASME)

TABLE 3

| | | | Example | | | | |
|---|---|---|---|---|---|---|---|
| | | | 1 | 2 | 3 | 4 | 5 |
| Thickness [mm] | Base material (X) | Stainless steel plate | 1 | | | 1 | 1 |
| | | Aluminum alloy plate | | 1 | | | |
| | | GF-added polypropylene | | | 1 | | |
| | | CF | | | | | |
| | | Copper plate | | | | | |
| | | Homo-PP (1) | | | | | |
| | | COC | | | | | |
| | Adhesive layer (Y) | A-1 | 1 | 1 | 1 | | |
| | | A-2 | | | | 1 | |
| | | A-3 | | | | | 1 |
| | Base material (Z) | POM | 2 | 2 | 2 | 2 | 2 |
| | | PA6 | | | | | |
| | | PBT | | | | | |
| | | Homo-PP (2) | | | | | |
| | | HDPE | | | | | |
| | | LDPE | | | | | |
| | | COC | | | | | |
| | | CF | | | | | |
| | | PC | | | | | |
| | | ABS | | | | | |

TABLE 3-continued

| Laminating method | Production method | | 1 | 1 | 1 | 1 | 1 |
|---|---|---|---|---|---|---|---|
| | Base material (X) and Adhesive layer (Y) ((X) + (Y)) and Base material (Z) | | Press Injection | Press Injection | Press Injection | Press Injection | Press Injection |
| | Injection molding condition | Cylinder temperature (° C.) | 210 | 210 | 210 | 210 | 210 |
| | | Mold temperature (° C.) | 70 | 70 | 70 | 70 | 70 |
| Evaluation | Storage modulus G' of Adhesive layer (Y) Unit [Pa] | 100° C. | $2.59 \times 10^5$ | $2.59 \times 10^5$ | $2.59 \times 10^5$ | $2.31 \times 10^5$ | $2.51 \times 10^5$ |
| | | 0° C. | $5.01 \times 10^5$ | $5.01 \times 10^5$ | $5.01 \times 10^5$ | $2.49 \times 10^8$ | $3.06 \times 10^6$ |
| | Loss modulus G" of Adhesive layer (Y) Unit [Pa] | 100° C. | $6.02 \times 10^4$ | $6.02 \times 10^4$ | $6.02 \times 10^4$ | $3.59 \times 10^4$ | $1.12 \times 10^5$ |
| | Adhesiveness | 23° C. | 1 | 1 | 1 | 1 | 1 |
| | | 0° C. | 1 | 1 | 1 | 2 | 2 |
| | Adhesive force 23° C. | N/cm² | 30 | 60 | 32 | 60 | 27 |

| | | | Example | | | | |
|---|---|---|---|---|---|---|---|
| | | | 6 | 7 | 8 | 9 | 10 |
| Thickness [mm] | Base material (X) | Stainless steel plate | 1 | 1 | 1 | 1 | 1 |
| | | Aluminum alloy plate | | | | | |
| | | GF-added polypropylene | | | | | |
| | | CF | | | | | |
| | | Copper plate | | | | | |
| | | Homo-PP (1) | | | | | |
| | | COC | | | | | |
| | Adhesive layer (Y) | A-1 | 1 | 1 | 1 | 1 | 1 |
| | | A-2 | | | | | |
| | | A-3 | | | | | |
| | Base material (Z) | POM | | | | | |
| | | PA6 | 2 | | | | |
| | | PBT | | 2 | | | |
| | | Homo-PP (2) | | | 2 | | |
| | | HDPE | | | | 2 | |
| | | LDPE | | | | | 2 |
| | | COC | | | | | |
| | | CF | | | | | |
| | | PC | | | | | |
| | | ABS | | | | | |
| Laminating method | Production method | | 1 | 1 | 1 | 1 | 1 |
| | Base material (X) and Adhesive layer (Y) ((X) + (Y)) and Base material (Z) | | Press Injection | Press Injection | Press Injection | Press Injection | Press Injection |
| | Injection molding condition | Cylinder temperature (° C.) | 260 | 260 | 230 | 230 | 230 |
| | | Mold temperature (° C.) | 80 | 50 | 50 | 50 | 50 |
| Evaluation | Storage modulus G' of Adhesive layer (Y) Unit [Pa] | 100° C. | $2.59 \times 10^5$ | $2.59 \times 10^5$ | $2.59 \times 10^5$ | $2.59 \times 10^5$ | $2.59 \times 10^5$ |
| | | 0° C. | $5.01 \times 10^5$ | $5.01 \times 10^5$ | $5.01 \times 10^5$ | $5.01 \times 10^5$ | $5.01 \times 10^5$ |
| | Loss modulus G" of Adhesive layer (Y) Unit [Pa] | 100° C. | $6.02 \times 10^4$ | $6.02 \times 10^4$ | $6.02 \times 10^4$ | $6.02 \times 10^4$ | $6.02 \times 10^4$ |
| | Adhesiveness | 23° C. | 1 | 1 | 1 | 1 | 1 |
| | | 0° C. | 1 | 1 | 1 | 1 | 1 |
| | Adhesive force 23° C. | N/cm² | 23 | 31 | 34 | 38 | 37 |

TABLE 4

| | | | Example | | | | |
|---|---|---|---|---|---|---|---|
| | | | 11 | 12 | 13 | 14 | 15 |
| Thickness [mm] | Base material (X) | Stainless steel plate | 1 | | 1 | 1 | 1 |
| | | Aluminum alloy plate | | | | | |
| | | GF-added polypropylene | | 0.25 | | | |
| | | CF | | | | | |
| | | Copper plate | | | | | |
| | | Homo-PP (1) | | | | | |
| | | COC | | | | | |
| | Adhesive layer (Y) | A-1 | 1 | 1 | 0.2 | 1 | 1 |
| | | A-2 | | | | | |
| | | A-3 | | | | | |
| | Base material (Z) | POM | | | | 2.8 | |
| | | PA6 | | | | | |
| | | PBT | | | | | |

TABLE 4-continued

|  |  |  |  |  |  |  |  |
|---|---|---|---|---|---|---|---|
|  |  | Homo-PP (2) |  |  |  |  |  |
|  |  | HDPE |  |  |  |  |  |
|  |  | LDPE |  |  |  |  |  |
|  |  | COC | 2 |  |  |  |  |
|  |  | CF |  | 0.25 |  |  |  |
|  |  | PC |  |  |  | 1 |  |
|  |  | ABS |  |  |  |  | 1 |
| Laminating method | Production method |  | 1 | 3 | 2 | 3 | 3 |
|  | Base material (X) and Adhesive layer (Y) |  | Press | Press | Coating (dipping) | Press | Press |
|  | ((X) + (Y)) and Base material (Z) |  | Injection | Press | Injection | Press | Press |
| Injection molding condition | Cylinder temperature (° C.) |  | 260 | — | 210 | — | — |
|  | Mold temperature (° C.) |  | 100 | — | 70 | — | — |
| Evaluation | Storage modulus G' of Adhesive layer (Y) Unit [Pa] | 100° C. | $2.59 \times 10^5$ | $2.59 \times 10^5$ | $2.59 \times 10^5$ | $2.59 \times 10^5$ | $2.59 \times 10^5$ |
|  |  | 0° C. | $5.01 \times 10^5$ | $5.01 \times 10^5$ | $5.01 \times 10^5$ | $5.01 \times 10^5$ | $5.01 \times 10^5$ |
|  | Loss modulus G" of Adhesive layer (Y) Unit [Pa] | 100° C. | $6.02 \times 10^4$ | $6.02 \times 10^4$ | $6.02 \times 10^4$ | $6.02 \times 10^4$ | $6.02 \times 10^4$ |
|  | Adhesiveness | 23° C. | 1 | 1 | 1 | 1 | 1 |
|  |  | 0° C. | 1 | 1 | 1 | 1 | 1 |
|  | Adhesive force 23° C. N/cm² |  | 29 | 34 | 29 | 26 | 28 |

|  |  |  | Example |  |  |  |
|---|---|---|---|---|---|---|
|  |  |  | 16 | 17 | 18 | 19 |
| Thickness [mm] | Base material (X) | Stainless steel plate |  |  |  |  |
|  |  | Aluminum alloy plate |  |  |  |  |
|  |  | GF-added polypropylene |  |  |  |  |
|  |  | CF |  |  |  |  |
|  |  | Copper plate | 1 |  |  |  |
|  |  | Homo-PP (1) |  | 1 |  | 2 |
|  |  | COC |  |  | 1 |  |
|  | Adhesive layer (Y) | A-1 | 1 | 1 | 1 | 1 |
|  |  | A-2 |  |  |  |  |
|  |  | A-3 |  |  |  |  |
|  | Base material (Z) | POM |  |  |  | 2 |
|  |  | PA6 |  |  |  |  |
|  |  | PBT |  |  |  |  |
|  |  | Homo-PP (2) |  |  |  |  |
|  |  | HDPE |  |  |  |  |
|  |  | LDPE |  |  |  |  |
|  |  | COC | 2 | 1 | 1 |  |
|  |  | CF |  |  |  |  |
|  |  | PC |  |  |  |  |
|  |  | ABS |  |  |  |  |
| Laminating method | Production method |  | 1 | 3 | 3 | 1 |
|  | Base material (X) and Adhesive layer (Y) |  | Press | Press | Press | Press |
|  | ((X) + (Y)) and Base material (Z) |  | Injection | Press | Press | Injection |
| Injection molding condition | Cylinder temperature (° C.) |  | 260 | — | — | 260 |
|  | Mold temperature (° C.) |  | 100 | — | — | 100 |
| Evaluation | Storage modulus G' of Adhesive layer (Y) Unit [Pa] | 100° C. | $2.59 \times 10^5$ | $2.59 \times 10^5$ | $2.59 \times 10^5$ | $2.59 \times 10^5$ |
|  |  | 0° C. | $5.01 \times 10^5$ | $5.01 \times 10^5$ | $5.01 \times 10^5$ | $5.01 \times 10^5$ |
|  | Loss modulus G" of Adhesive layer (Y) Unit [Pa] | 100° C. | $6.02 \times 10^4$ | $6.02 \times 10^4$ | $6.02 \times 10^4$ | $6.02 \times 10^4$ |
|  | Adhesiveness | 23° C. | 1 | 1 | 1 | 1 |
|  |  | 0° C. | 1 | 1 | 1 | 2 |
|  | Adhesive force 23° C. N/cm² |  | 33 | 27 | 228 | 22 |

TABLE 5

| | | | Comparative Example | | | | | |
|---|---|---|---|---|---|---|---|---|
| | | | 1 | 2 | 3 | 4 | 5 | 6 |
| Thickness [mm] | Base material (X) | Stainless steel plate | 1 | 1 | 1 | 1 | 1 | 1 |
| | Adhesive layer (Y) | SEPTON | 1 | | | 0.2 | | |
| | | Tufftec | | 1 | | | 0.2 | |
| | | KRATON | | | 1 | | | 0.2 |
| | Base material (Z) | POM | 2 | 2 | 2 | 2.8 | 2.8 | 2.8 |
| Laminating method | Production method | | 1 | 1 | 1 | 2 | 2 | 2 |
| | Base material (X) and Adhesive layer (Y) | | Press | Press | Press | Coating (dipping) | Coating (dipping) | Coating (dipping) |
| | ((X) + (Y)) and Base material (Z) | | Injection | Injection | Injection | Injection | Injection | Injection |
| | Injection molding condition | Cylinder temperature (° C.) | 210 | 210 | 210 | 210 | 210 | 210 |
| | | Mold temperature (° C.) | 70 | 70 | 70 | 70 | 70 | 70 |
| Evaluation | Storage modulus G' of Adhesive layer (Y) Unit [Pa] | 100° C. | $9.10 \times 10^5$ | $1.04 \times 10^5$ | $1.09 \times 10^5$ | $9.10 \times 10^5$ | $1.04 \times 10^5$ | $1.09 \times 10^5$ |
| | | 0° C. | $1.10 \times 10^6$ | $9.74 \times 10^5$ | $5.17 \times 10^5$ | $1.10 \times 10^6$ | $9.74 \times 10^5$ | $5.17 \times 10^5$ |
| | Loss modulus G" of Adhesive layer (Y) Unit [Pa] | 100° C. | $1.88 \times 10^5$ | $2.85 \times 10^4$ | $2.76 \times 10^4$ | $1.88 \times 10^5$ | $2.85 \times 10^4$ | $2.76 \times 10^4$ |
| | Adhesiveness | 23° C. | 3 | 3 | 3 | 3 | 3 | 3 |
| | Adhesive force | N/cm² | Not measurable* | Not measurable* | Not measurable* | Not measurable* | Not measurable* | Not measurable* |

Not measurable*: The adhesive force was low, and peeling occurred when the sample was prepared or when the sample was attached to a tensile tester.

TABLE 6

| | | | Example | | | |
|---|---|---|---|---|---|---|
| | | | 20 | 21 | 22 | 23 |
| Thickness [mm] | Base material (X) | Homo-PP (1) | 0.04 | 0.04 | 0.04 | 0.04 |
| | | HDPE | | | | |
| | Adhesive layer (Y) | A-1 | 0.005 | 0.005 | 0.005 | 0.005 |
| | | SEPTON | | | | |
| | Base material (Z) | Homo-PP (2) | 1 | | | |
| | | LDPE (2) | | 1 | | |
| | | GF-added polypropylene | | | 1 | |
| | | ABS | | | | 1 |
| | | PBT | | | | |
| | | PA6 | | | | |
| | | PC | | | | |
| | | Copper plate | | | | |
| Laminating method | Production method | | 4 | 4 | 4 | 4 |
| | Base material (X) and Adhesive layer (Y) | | Co-extrusion | Co-extrusion | Co-extrusion | Co-extrusion |
| | ((X) + (Y)) and Base material (Z) | | Press | Press | Press | Press |
| | Extrusion molding condition | Barrel temperature (° C.) (Base material (X) side) | 200 | 200 | 200 | 200 |
| | | Barrel temperature (° C.) (Adhesive layer (Y) side) | 190 | 190 | 190 | 190 |
| | | T-die temperature (° C.) | 180 | 180 | 180 | 180 |
| Evaluation | Storage modulus G' of Adhesive layer (Y) Unit [Pa] | 100° C. | $2.59 \times 10^5$ | $2.59 \times 10^5$ | $2.59 \times 10^5$ | $2.59 \times 10^5$ |
| | | 0° C. | $5.01 \times 10^5$ | $5.01 \times 10^5$ | $5.01 \times 10^5$ | $5.01 \times 10^5$ |
| | Loss modulus G" of Adhesive layer (Y) Unit [Pa] | 100° C. | $6.02 \times 10^4$ | $6.02 \times 10^4$ | $6.02 \times 10^4$ | $6.02 \times 10^4$ |
| | Adhesiveness | 23° C. | 1 | 1 | 1 | 1 |

| | | | Example | | |
|---|---|---|---|---|---|
| | | | 24 | 25 | 26 |
| Thickness [mm] | Base material (X) | Homo-PP (1) | 0.04 | 0.04 | 0.04 |
| | | HDPE | | | |
| | Adhesive layer (Y) | A-1 | 0.005 | 0.005 | 0.005 |
| | | SEPTON | | | |
| | Base material (Z) | Homo-PP (2) | | | |
| | | LDPE (2) | | | |
| | | GF-added polypropylene | | | |

TABLE 6-continued

|  |  |  |  |  |  |
|---|---|---|---|---|---|
|  |  | ABS |  |  |  |
|  |  | PBT | 1 |  |  |
|  |  | PA6 |  | 1 |  |
|  |  | PC |  |  | 1 |
|  |  | Copper plate |  |  |  |
| Laminating method |  | Production method | 4 | 4 | 4 |
|  | Base material (X) and Adhesive layer (Y) |  | Co-extrusion | Co-extrusion | Co-extrusion |
|  | ((X) + (Y)) and Base material (Z) |  | Press | Press | Press |
| Extrusion molding condition | Barrel temperature (° C.) (Base material (X) side) |  | 200 | 200 | 200 |
|  | Barrel temperature (° C.) (Adhesive layer (Y) side) |  | 190 | 190 | 190 |
|  | T-die temperature (° C.) |  | 180 | 180 | 180 |
| Evaluation | Storage modulus G' of Adhesive layer (Y) Unit [Pa] | 100° C. | $2.59 \times 10^5$ | $2.59 \times 10^5$ | $2.59 \times 10^5$ |
|  |  | 0° C. | $5.01 \times 10^5$ | $5.01 \times 10^5$ | $5.01 \times 10^5$ |
|  | Loss modulus G" of Adhesive layer (Y) Unit [Pa] | 100° C. | $6.02 \times 10^4$ | $6.02 \times 10^4$ | $6.02 \times 10^4$ |
|  | Adhesiveness | 23° C. | 1 | 1 | 1 |

TABLE 7

|  |  |  | Example |  |  |  |  |  |  |
|---|---|---|---|---|---|---|---|---|---|
|  |  |  | 27 | 28 | 29 | 30 | 31 | 32 | 33 |
| Thickness [mm] | Base material (X) | Homo-PP (1) | 0.04 |  |  |  |  |  |  |
|  |  | HDPE |  | 0.03 | 0.03 | 0.03 | 0.03 | 0.03 | 0.03 |
|  | Adhesive layer (Y) | A-1 | 0.005 | 0.008 | 0.008 | 0.008 | 0.008 | 0.008 | 0.008 |
|  |  | SEPTON |  |  |  |  |  |  |  |
|  | Base material (Z) | Homo-PP (2) |  |  | 1 |  |  |  |  |
|  |  | LDPE (2) |  |  |  | 1 |  |  |  |
|  |  | GF-added polypropylene |  |  |  |  | 1 |  |  |
|  |  | ABS |  |  |  |  |  | 1 |  |
|  |  | PBT |  |  |  |  |  |  |  |
|  |  | PA6 |  |  |  |  |  |  |  |
|  |  | PC |  |  |  |  |  |  |  |
|  |  | Copper plate | 1 |  |  |  |  |  | 1 |
| Laminating method |  | Production method | 4 | 4 | 4 | 4 | 4 | 4 | 4 |
|  | Base material (X) and Adhesive layer (Y) |  | Co-extrusion | Co-extrusion | Co-extrusion | Co-extrusion | Co-extrusion | Co-extrusion | Co-extrusion |
|  | ((X) + (Y)) and Base material (Z) |  | Press | Press | Press | Press | Press | Press | Press |
| Extrusion molding condition | Barrel temperature (° C.) (Base material (X) side) |  | 200 | 200 | 200 | 200 | 200 | 200 | 200 |
|  | Barrel temperature (° C.) (Adhesive layer (Y) side) |  | 190 | 190 | 190 | 190 | 190 | 190 | 190 |
|  | T-die temperature (° C.) |  | 180 | 180 | 180 | 180 | 180 | 180 | 180 |
| Evaluation | Storage modulus G' of Adhesive layer (Y) Unit [Pa] | 100° C. | $2.59 \times 10^5$ | $2.59 \times 10^5$ | $2.59 \times 10^5$ | $2.59 \times 10^5$ | $2.59 \times 10^5$ | $2.59 \times 10^5$ | $2.59 \times 10^5$ |
|  |  | 0° C. | $5.01 \times 10^5$ | $5.01 \times 10^5$ | $5.01 \times 10^5$ | $5.01 \times 10^5$ | $5.01 \times 10^5$ | $5.01 \times 10^5$ | $5.01 \times 10^5$ |
|  | Loss modulus G" of Adhesive layer (Y) Unit [Pa] | 100° C. | $6.02 \times 10^4$ | $6.02 \times 10^4$ | $6.02 \times 10^4$ | $6.02 \times 10^4$ | $6.02 \times 10^4$ | $6.02 \times 10^4$ | $6.02 \times 10^4$ |
|  | Adhesiveness | 23° C. | 1 | 1 | 1 | 1 | 1 | 1 | 1 |

TABLE 8

|  |  |  | Comparative Example |  |  |  |
|---|---|---|---|---|---|---|
|  |  |  | 7 | 8 | 9 | 10 |
| Thickness [mm] | Base material (X) | Homo-PP (1) | 0.05 | 0.05 | 0.05 | 0.05 |
|  |  | HDPE |  |  |  |  |
|  | Adhesive layer (Y) | A-1 |  |  |  |  |
|  |  | SEPTON | 0.01 | 0.02 | 0.03 | 0.01 |
|  | Base material (Z) | Homo-PP (2) | 1 |  |  |  |
|  |  | LDPE (2) |  | 1 |  |  |
|  |  | GF-added polypropylene |  |  | 1 |  |
|  |  | ABS |  |  |  | 1 |
|  |  | PBT |  |  |  |  |

TABLE 8-continued

|  |  |  | | | | |
|---|---|---|---|---|---|---|
|  |  | PA6 |  |  |  |  |
|  |  | PC |  |  |  |  |
|  |  | Copper plate |  |  |  |  |
| Laminating method | Production method | | 4 | 4 | 4 | 4 |
|  | Base material (X) and Adhesive layer (Y) | | Co-extrusion | Co-extrusion | Co-extrusion | Co-extrusion |
|  | ((X) + (Y)) and Base material (Z) | | Press | Press | Press | Press |
|  | Extrusion molding condition | Barrel temperature (° C.) (Base material (X) side) | 200 | 200 | 200 | 200 |
|  |  | Barrel temperature (° C.) (Adhesive layer (Y) side) | 190 | 190 | 190 | 190 |
|  |  | T-die temperature (° C.) | 180 | 180 | 180 | 180 |
| Evaluation | Storage modulus G' of Adhesive layer (Y) Unit [Pa] | 100° C. | $9.10 \times 10^5$ | $9.10 \times 10^5$ | $9.10 \times 10^5$ | $9.10 \times 10^5$ |
|  |  | 0° C. | $1.10 \times 10^6$ | $1.10 \times 10^6$ | $1.10 \times 10^6$ | $1.10 \times 10^6$ |
|  | Loss modulus G" of Adhesive layer (Y) Unit [Pa] | 100° C. | $1.88 \times 10^5$ | $1.88 \times 10^5$ | $1.88 \times 10^5$ | $1.88 \times 10^5$ |
|  | Adhesiveness | 23° C. | 3 | 3 | 3 | 3 |

|  |  |  | Comparative Example | | | |
|---|---|---|---|---|---|---|
|  |  |  | 11 | 12 | 13 | 14 |
| Thickness [mm] | Base material (X) | Homo-PP (1) | 0.05 | 0.05 | 0.05 | 0.05 |
|  |  | HDPE |  |  |  |  |
|  | Adhesive layer (Y) | A-1 |  |  |  |  |
|  |  | SEPTON | 0.02 | 0.03 | 0.03 | 0.03 |
|  | Base material (Z) | Homo-PP (2) |  |  |  |  |
|  |  | LDPE (2) |  |  |  |  |
|  |  | GF-added polypropylene |  |  |  |  |
|  |  | ABS |  |  |  |  |
|  |  | PBT | 1 |  |  |  |
|  |  | PA6 |  | 1 |  |  |
|  |  | PC |  |  | 1 |  |
|  |  | Copper plate |  |  |  | 1 |
| Laminating method | Production method | | 4 | 4 | 4 | 4 |
|  | Base material (X) and Adhesive layer (Y) | | Co-extrusion | Co-extrusion | Co-extrusion | Co-extrusion |
|  | ((X) + (Y)) and Base material (Z) | | Press | Press | Press | Press |
|  | Extrusion molding condition | Barrel temperature (° C.) (Base material (X) side) | 200 | 200 | 200 | 200 |
|  |  | Barrel temperature (° C.) (Adhesive layer (Y) side) | 190 | 190 | 190 | 190 |
|  |  | T-die temperature (° C.) | 180 | 180 | 180 | 180 |
| Evaluation | Storage modulus G' of Adhesive layer (Y) Unit [Pa] | 100° C. | $9.10 \times 10^5$ | $9.10 \times 10^5$ | $9.10 \times 10^5$ | $9.10 \times 10^5$ |
|  |  | 0° C. | $1.10 \times 10^6$ | $1.10 \times 10^6$ | $1.10 \times 10^6$ | $1.10 \times 10^6$ |
|  | Loss modulus G" of Adhesive layer (Y) Unit [Pa] | 100° C. | $1.88 \times 10^5$ | $1.88 \times 10^5$ | $1.88 \times 10^5$ | $1.88 \times 10^5$ |
|  | Adhesiveness | 23° C. | 3 | 3 | 3 | 3 |

TABLE 9

|  |  |  | Example 34 | Comparative Example 15 |
|---|---|---|---|---|
| Thickness [mm] | Base material (X) | Stainless steel plate | 1 | 1 |
|  | Adhesive layer (Y) | A-1 | 1 |  |
|  |  | SEPTON |  | 1 |
|  | Base material (Z) | POM | 1 | 1 |
| Laminating method | Production method | | 5 | 5 |
|  | Base material (X) and Adhesive layer (Y) | | Injection | Injection |
|  | ((X) + (Y)) and Base material (Z) | | Injection | Injection |
|  | Injection molding condition | Cylinder temperature (° C.) | 260 | 260 |
|  |  | Mold temperature (° C.) | 80 | 80 |

TABLE 9-continued

|  |  |  | Example 34 | Comparative Example 15 |
|---|---|---|---|---|
| Evaluation | Storage modulus G' of Adhesive layer (Y) Unit [Pa] | 100° C. | $2.59 \times 10^5$ | $9.10 \times 10^5$ |
|  |  | 0° C. | $5.01 \times 10^5$ | $1.10 \times 10^6$ |
|  | Loss modulus G" of Adhesive layer (Y) Unit [Pa] | 100° C. | $6.02 \times 10^4$ | $1.88 \times 10^5$ |
|  | Adhesiveness | 23° C. | 2 | 3 |

TABLE 10

|  |  |  | Arithmetic average surface roughness (Ra) (μm) | Example | | | | |
|---|---|---|---|---|---|---|---|---|
|  |  |  |  | 35 | 36 | 37 | 38 | 39 |
| Thickness [mm] | Base material (X) | Stainless steel plate | 0.228 | 1 | | | | |
|  |  |  | 0.147 | | 1 | | | |
|  |  |  | 0.078 | | | 1 | | |
|  |  | Homo-PP (2) | 0.161 | | | | 1 | |
|  |  |  | 3.943 | | | | | 1 |
|  | Adhesive layer (Y) | A-1 | | | | 1 | | |
|  | Base material (Z) | POM | | | | 1 | | |
| Laminating method | Production method | | | | | 1 | | |
|  | Base material (X) and Adhesive layer (Y) | | | | | Press | | |
|  | ((X) + (Y)) and Base material (Z) | | | | | Injection | | |
| Evaluation | Storage modulus G' of Adhesive layer (Y) Unit [Pa] | 100° C. | | | | $2.59 \times 10^5$ | | |
|  |  | 0° C. | | | | $5.01 \times 10^5$ | | |
|  | Loss modulus G" of Adhesive layer (Y) Unit [Pa] | 100° C. | | | | $6.02 \times 10^4$ | | |
|  | Adhesive force | 23° C., N/cm² | | 24 | 32 | 34 | 36 | 45 |

As is clear from the results in Table 3 to Table 10, it is found that the multilayer body of the present invention has good adhesiveness.

Reference Example: Hardness Measurement Method of Adhesive Layer (Y)

The hardness of the adhesive layer (Y) was measured in the following manner using A-1 to A-3 as the material of the adhesive layer (Y). First, each of A-1 to A-3 was subjected to compression press-molding at 200° C. under a load of 100 kgf/cm² for 3 minutes and then compression press-molding at 30° C. under a load of 15 kgf/cm² for 1 minute using a compression press-molding machine "NF-37" manufactured by Shinto Metal Industries Ltd., using a Teflon (registered trademark) coated metal frame as a spacer to obtain an adhesive layer (Y) having a thickness of 1 mm.

The obtained sheet was cut into approximately 5 cm×5 cm, six sheets were stacked, and the hardness having a thickness of 6 mm was measured in accordance with JIS K 6253-3:2012 using an indenter of a Type A durometer at room temperature of 23° C. and in a thermostatic chamber at 0° C.

The INDEX was calculated based on the following relational expression (i) using a value obtained by measuring a hardness at the atmospheric temperature of 23° C. and a value obtained by measuring a hardness in a thermostatic chamber at 0° C.

(hardness at 0° C./hardness at 23° C.)×100≤s(IN-DEX)    (i)

TABLE 11

|  |  | Adhesive layer (Y) | | | | | |
|---|---|---|---|---|---|---|---|
|  |  | A-1 | | A-2 | | A-3 | |
|  | Temperature | Measurement value | INDEX | Measurement value | INDEX | Measurement value | INDEX |
| Hardness | 0° C. | 31 | 111 | 92 | 137 | 80 | 113 |
|  | 23° C. | 28 | — | 67 | — | 71 | — |

From the results shown in Table 11, it can be seen that the adhesive layer (Y) has a high rubber elastic modulus because the value derived from the relational expression (i) is 140 or less, so that the base material (X) and the base material (Z) are firmly bonded to each other and are hardly peeled off.

The invention claimed is:

1. A multilayer body comprising a base material (X), an adhesive layer (Y), and a base material (Z) in this order, wherein the adhesive layer (Y) contains a hydrogenated block copolymer (A) obtained by hydrogenating a block copolymer (P) containing a polymer block (a) composed of a structural unit derived from an aromatic vinyl compound and a polymer block (b) composed of a structural unit derived from a conjugated diene, the mass ratio [(a)/(b)] of the polymer block (a) to the polymer block (b) is 1/99 to 50/50, and the adhesive layer (Y) has a storage modulus G' at 100° C. of $1.20 \times 10^5$ to $4.00 \times 10^5$ Pa;

wherein the polymer block (b) contains 1 to 100% by mass of a structural unit (b1) derived from farnesene and contains 0 to 99% by mass of a structural unit (b2) derived from a conjugated diene other than farnesene.

2. The multilayer body according to claim 1, wherein the adhesive layer (Y) has a loss modulus G" at 100° C. of $3.00 \times 10^4$ to $2.50 \times 10^5$ Pa.

3. The multilayer body according to claim 1, wherein the adhesive layer (Y) is composed of a thermoplastic elastomer composition containing a hydrogenated block copolymer (A).

4. The multilayer body according to claim 1, wherein the conjugated diene other than farnesene is at least one selected from butadiene, isoprene, and myrcene.

5. The multilayer body according to claim 1, wherein a hydrogenation rate of the carbon-carbon double bond in the polymer block (b) is 70 mol % or more.

6. The multilayer body according to claim 1, wherein the hydrogenated block copolymer (A) has a peak top molecular weight (Mp) of 4,000 to 1,500,000.

7. The multilayer body according to claim 1, wherein the hydrogenated block copolymer (A) has a molecular weight distribution (Mw/Mn) of 1.00 to 4.00.

8. The multilayer body according to claim 1, wherein the aromatic vinyl compound is styrene.

9. The multilayer body according to claim 8, wherein the polymer block (a) composed of a structural unit derived from styrene has a peak top molecular weight of 2,000 to 55,000.

10. The multilayer body according to claim 1, wherein the base material (X) and the base material (Z) are each independently at least one selected from a metal, a polar resin, a polyolefin resin, a carbon fiber, glass, and ceramics.

11. The multilayer body according to claim 1, wherein the adhesive layer (Y) satisfies the following relational expression (i):

$$[(\text{hardness at } 0° \text{ C.}/\text{hardness at } 23° \text{ C.}) \times 100 \leq 140] \quad (i).$$

12. The multilayer body according toslaim 1, wherein the hydrogenated block copolymer (A) is a mixture of two or more kinds of hydrogenated block copolymers, and a content of a diblock copolymer in the hydrogenated block copolymer (A) is 50% by mass or less.

13. The multilayer body according to claim 1, wherein a shear adhesive force of the adhesive layer (Y) at 23° C. is 10 N/cm$^2$ or more when a stainless steel plate is used as the base material (X) and a polyacetal resin is used as the base material (Z).

14. The multilayer body according to claim 1, wherein the base material (X) and the base material (Z) each have an arithmetic average roughness (Ra) of 0.010 to 10 μm.

15. A method for producing the multilayer body according to claim 1, comprising:
press-molding the adhesive layer (Y) onto the base material (X); and subsequently
injection-molding the base material (Z) onto the adhesive layer.

16. A method for producing the multilayer body according to claim 1, comprising:
forming the adhesive layer (Y) by applying a solution and/or an aqueous emulsion containing the hydrogenated block copolymer (A) onto the base material (X) and then drying the solution and/or the aqueous emulsion; and subsequently
injection-molding the base material (Z) onto the adhesive layer.

17. A method for producing the multilayer body according to claim 1, comprising:
press-molding the adhesive layer (Y) onto the base material (X); and subsequently
press-molding the base material (Z) onto the adhesive layer.

18. The method for producing a multilayer body according to claim 15, wherein the base material (X) is a metal, and the base material (Z) is a polar resin or a polyolefin resin.

* * * * *

UNITED STATES PATENT AND TRADEMARK OFFICE
CERTIFICATE OF CORRECTION

PATENT NO. : 11,951,731 B2
APPLICATION NO. : 17/802637
DATED : April 9, 2024
INVENTOR(S) : Konishi et al.

Page 1 of 1

It is certified that error appears in the above-identified patent and that said Letters Patent is hereby corrected as shown below:

In the Claims

Column 42, Line 10 (Claim 12, Line 1), please change "toslaim" to -- to claim --.
Column 42, Line 28 (Claim 15, Line 6), please change "layer." to -- layer (Y). --.
Column 42, Line 37 (Claim 16, Line 9), please change "layer." to -- layer (Y). --.
Column 42, Line 43 (Claim 17, Line 6), please change "layer." to -- layer (Y). --.

Signed and Sealed this
Tenth Day of September, 2024

Katherine Kelly Vidal
*Director of the United States Patent and Trademark Office*